(12) United States Patent
Kapustin et al.

(10) Patent No.: US 12,372,254 B2
(45) Date of Patent: *Jul. 29, 2025

(54) HEAT PUMP-BASED WATER HARVESTING SYSTEMS

(71) Applicant: Water Harvesting, Inc., Newark, CA (US)

(72) Inventors: Ievgen Kapustin, Newark, CA (US); David S. Kuo, Newark, CA (US)

(73) Assignee: Water Harvesting, Inc., Fremont, CA (US)

( * ) Notice: Subject to any disclaimer, the term of this patent is extended or adjusted under 35 U.S.C. 154(b) by 496 days.

This patent is subject to a terminal disclaimer.

(21) Appl. No.: 17/881,915

(22) Filed: Aug. 5, 2022

(65) Prior Publication Data

US 2023/0063572 A1 Mar. 2, 2023

Related U.S. Application Data

(60) Provisional application No. 63/236,173, filed on Aug. 23, 2021.

(51) Int. Cl.
*B01D 53/04* (2006.01)
*B01D 53/06* (2006.01)
(Continued)

(52) U.S. Cl.
CPC ........ *F24F 3/1423* (2013.01); *B01D 53/0438* (2013.01); *B01D 53/06* (2013.01);
(Continued)

(58) Field of Classification Search
CPC .. F24F 3/1423; F24F 11/0001; F24F 11/0008; F24F 2006/008;
(Continued)

(56) References Cited

U.S. PATENT DOCUMENTS

| 1,559,762 A | 11/1925 | Newman |
| 4,180,985 A | 1/1980 | Northrup, Jr. |

(Continued)

FOREIGN PATENT DOCUMENTS

| CA | 3120865 | 7/2023 |
| CN | 102639540 A | 8/2012 |

(Continued)

OTHER PUBLICATIONS

Furukawa et al. Water Adsorption in Porous Metal-Organic Frameworks and Related Materials. J. Am. Chem. Soc., Mar. 2014, 136, 11, 4369-4381.

(Continued)

*Primary Examiner* — Frank M Lawrence, Jr.
*Assistant Examiner* — Frank Lawrence
(74) *Attorney, Agent, or Firm* — Craig R. Miles; CR MILES P.C.

(57) ABSTRACT

Water harvesting systems and methods of making and using such water harvesting systems, for capturing water from surrounding air using configurations that reduce overall energy costs and improves water harvesting cycle efficiency in the water harvesting system. In particular embodiments, the water harvesting system can be configured for dehumidification-humidification of air, and a method in the water harvesting system for dehumidification-humidification to control moisture level in the air conditioned by the water harvesting system. The systems and methods use sorbent materials, such as metal-organic frameworks, to adsorb water from the air. The systems and methods desorb this water in the form of water vapor, and the water vapor can be condensed into liquid water and collected to dehumidify air conditioned by the water harvesting system. The collected liquid water can be sprayed to humidify air conditioned by the water harvesting system.

19 Claims, 11 Drawing Sheets

(51) Int. Cl.
    *B01D 53/26* (2006.01)
    *B01J 20/22* (2006.01)
    *B01J 20/34* (2006.01)
    *F24F 3/14* (2006.01)
    *F24F 11/00* (2018.01)
    *G05D 22/02* (2006.01)
    *F24F 6/00* (2006.01)

(52) U.S. Cl.
    CPC .......... *B01D 53/261* (2013.01); *B01J 20/226* (2013.01); *B01J 20/3483* (2013.01); *F24F 11/0001* (2013.01); *F24F 11/0008* (2013.01); *G05D 22/02* (2013.01); *B01D 2253/204* (2013.01); *B01D 2257/80* (2013.01); *B01D 2259/40098* (2013.01); *F24F 2006/008* (2013.01); *F24F 2011/0002* (2013.01)

(58) Field of Classification Search
    CPC .......... F24F 2011/0002; B01D 53/0438; B01D 53/261; B01D 53/04; B01D 53/0407; B01D 53/0454; B01D 53/0462; B01D 53/06; B01D 53/08; B01D 2253/204; B01D 2257/80; B01D 2259/40098; B01D 53/265; B01J 20/226; B01J 20/3483; G05D 22/02; Y02A 20/00
    USPC .......... 96/108, 109, 121–123, 126–128, 130, 96/146; 95/107, 114, 115, 117, 121, 126
    See application file for complete search history.

(56) References Cited

U.S. PATENT DOCUMENTS

| | | |
|---|---|---|
| 4,304,577 A | 12/1981 | Ito et al. |
| 4,646,541 A | 3/1987 | Reid et al. |
| 5,565,139 A | 10/1996 | Walker et al. |
| 5,632,802 A | 5/1997 | Grgich et al. |
| 5,632,954 A | 5/1997 | Coellner et al. |
| 6,074,972 A | 6/2000 | Bratton et al. |
| 6,334,316 B1 | 1/2002 | Maeda |
| 6,684,648 B2 | 2/2004 | Faqih |
| 8,500,886 B2 | 8/2013 | Okano |
| 8,627,673 B2 | 1/2014 | Hill et al. |
| 8,864,882 B2 | 7/2014 | Kametani |
| 9,134,038 B2 | 9/2015 | Lee et al. |
| 9,446,969 B1 | 9/2016 | Redman et al. |
| 10,168,057 B2 | 1/2019 | Goldsworthy et al. |
| 10,266,737 B2 | 4/2019 | Van Horn et al. |
| 10,695,741 B2 | 6/2020 | Motkuri et al. |
| 10,829,913 B1 | 11/2020 | Ahmed et al. |
| 10,857,855 B2 | 12/2020 | Tomita et al. |
| 10,948,202 B2 | 3/2021 | Lee et al. |
| 11,029,045 B2 | 6/2021 | Woods et al. |
| 11,065,573 B2 | 7/2021 | Matuska et al. |
| 11,559,762 B1 * | 1/2023 | Kuo .................... B01J 20/3433 |
| 11,679,339 B2 | 6/2023 | Van de Mortel |
| 12,000,122 B2 | 6/2024 | Yaghi et al. |
| 2004/0107832 A1 | 6/2004 | Tongue et al. |
| 2004/0123615 A1 | 7/2004 | Yabu |
| 2004/0123616 A1 | 7/2004 | Lee et al. |
| 2004/0244398 A1 | 12/2004 | Radermacher et al. |
| 2005/0044862 A1 | 3/2005 | Vetrovec et al. |
| 2006/0130652 A1 | 6/2006 | Takewaki et al. |
| 2007/0028769 A1 * | 2/2007 | Eplee .................... B01D 53/06 95/113 |
| 2009/0139254 A1 | 6/2009 | Landry |
| 2009/0151368 A1 | 6/2009 | Bar |
| 2009/0260385 A1 | 10/2009 | Hill et al. |
| 2010/0126344 A1 | 5/2010 | Stein et al. |
| 2010/0175557 A1 | 7/2010 | Shih et al. |
| 2011/0056220 A1 | 3/2011 | Caggiano |
| 2011/0088552 A1 | 4/2011 | Ike et al. |
| 2011/0296858 A1 | 12/2011 | Caggiano |
| 2012/0172612 A1 | 7/2012 | Yaghi et al. |
| 2013/0036913 A1 | 2/2013 | Fukudome |
| 2013/0061752 A1 | 3/2013 | Farha et al. |
| 2013/0192281 A1 | 8/2013 | Nam et al. |
| 2013/0269522 A1 | 10/2013 | DeValve |
| 2013/0312451 A1 | 11/2013 | Max |
| 2014/0138236 A1 | 5/2014 | White |
| 2014/0165637 A1 | 6/2014 | Ma |
| 2014/0287150 A1 | 9/2014 | Miljkovic et al. |
| 2014/0326133 A1 | 11/2014 | Wang et al. |
| 2014/0338425 A1 | 11/2014 | Kalbassi et al. |
| 2016/0030858 A1 | 2/2016 | Giacomini |
| 2016/0084541 A1 | 3/2016 | Aguado et al. |
| 2016/0334145 A1 | 11/2016 | Pahwa et al. |
| 2017/0008915 A1 | 1/2017 | Yaghi et al. |
| 2017/0113184 A1 | 4/2017 | Eisenberger |
| 2017/0129307 A1 | 5/2017 | Zhou et al. |
| 2017/0211851 A1 | 7/2017 | Feng et al. |
| 2017/0234576 A1 | 8/2017 | Kawagoe et al. |
| 2017/0292737 A1 | 10/2017 | Moon |
| 2017/0354920 A1 | 12/2017 | Switzer et al. |
| 2018/0043295 A1 | 2/2018 | Friesen et al. |
| 2018/0171604 A1 * | 6/2018 | Kim .................... B01J 20/3204 |
| 2018/0209123 A1 | 6/2018 | Bahrami et al. |
| 2018/0261882 A1 | 9/2018 | Chang et al. |
| 2019/0100903 A1 | 4/2019 | Panda et al. |
| 2019/0234053 A1 | 8/2019 | Kim et al. |
| 2019/0323714 A1 | 10/2019 | Cui |
| 2020/0009497 A1 | 1/2020 | Matuska et al. |
| 2020/0182734 A1 | 6/2020 | Ueno et al. |
| 2020/0206679 A1 | 7/2020 | Stuckenberg |
| 2020/0283997 A1 | 9/2020 | Salloum et al. |
| 2020/0316514 A1 | 10/2020 | Fuchs et al. |
| 2020/0363078 A1 | 11/2020 | Mulet et al. |
| 2021/0062478 A1 | 3/2021 | Friesen et al. |
| 2021/0156124 A1 | 5/2021 | Yaghi et al. |
| 2021/0237535 A1 | 8/2021 | Goel et al. |
| 2021/0283528 A1 * | 9/2021 | Pokorný et al. ........ B01D 5/009 |
| 2021/0283574 A1 | 9/2021 | Yaghi et al. |
| 2021/0285189 A1 * | 9/2021 | Pokorný .................... E03B 3/28 |
| 2021/0394114 A1 * | 12/2021 | Schmaelzle .......... B01D 53/261 |
| 2022/0001328 A1 | 1/2022 | Yoon et al. |
| 2022/0106203 A1 | 4/2022 | Marchon et al. |
| 2022/0170247 A1 | 6/2022 | Yaghi et al. |
| 2022/0349158 A1 * | 11/2022 | Kapustin ................ B01J 20/226 |
| 2022/0389691 A1 | 12/2022 | Kuo et al. |
| 2023/0063572 A1 | 3/2023 | Kapustin |
| 2023/0264138 A1 | 8/2023 | McGrail et al. |

FOREIGN PATENT DOCUMENTS

| | | |
|---|---|---|
| CN | 106029674 A | 10/2016 |
| CN | 205718197 | 11/2016 |
| CN | 1077722290 A | 2/2018 |
| CN | 114182784 A | 3/2022 |
| CZ | 2018-337 | 7/2019 |
| EP | 0816225 A1 | 1/1998 |
| EP | 2507247 A1 | 10/2012 |
| EP | 3721971 A1 | 10/2020 |
| GB | 2540798 A | 2/2017 |
| JP | S63-107720 A | 5/1988 |
| JP | 2013-512223 A | 4/2013 |
| JP | 2017-509607 A | 4/2017 |
| JP | 2018080146 A | 5/2018 |
| WO | WO 03/097216 A1 | 11/2003 |
| WO | WO 2015/127033 A1 | 8/2015 |
| WO | WO2016/186454 A1 | 11/2016 |
| WO | WO 2018/118377 A1 | 6/2018 |
| WO | WO 2018/230430 A1 | 12/2018 |
| WO | WO 2019/010102 A1 | 1/2019 |
| WO | WO 2019/058158 A1 | 3/2019 |
| WO | WO 2019/082000 A1 | 5/2019 |
| WO | WO 2019/152962 A2 | 8/2019 |
| WO | WO 2020/036905 A1 | 2/2020 |
| WO | WO 2020/099561 A1 | 5/2020 |
| WO | WO 2020/112899 | 6/2020 |
| WO | WO 2020/154427 A1 | 7/2020 |
| WO | WO 2021/034477 A1 | 2/2021 |
| WO | WO 2021/067179 A1 | 4/2021 |

(56) References Cited

FOREIGN PATENT DOCUMENTS

| WO | WO 2021/162894 A1 | 8/2021 |
|----|-------------------|--------|
| WO | WO 2023/146800 A1 | 8/2023 |
| WO | WO 2023/181058 A1 | 9/2023 |

OTHER PUBLICATIONS

Janiak et al. Solid-Solution Mixed-Linker Synthesis of Isoreticular Al-Based MOFs for and Easy Hydrophilicity Tuning in Water-Sorption Heat Transformations. Chem. Mater., May 2019, 31, 11, 4051-4062.
Fang et al. One-Pot Synthesis of Two-Linker Mixed Al-Based Metal-Organic Frameworks for Modulated Water Vapor Adsorption. Cryst. Growth Des., Aug. 2020, 20, 10, 6565-6572.
Global Cooling Prize. Transaera and partner Haier. Website, https://globalcoolingprize.org/transaera-inc/, originally downloaded Nov. 21, 2022, 3 pages.
PCT International Patent Application No. PCT/US23/33098, International Search Report and Written Opinion of the International Searching Authority dated Nov. 30, 2023, 11 pages.
U.S. Appl. No. 17/424,147, Office Action mailed Oct. 2, 2023.
Brazilian Patent Application No. BR112021010139-0, Office Action mailed Jul. 9, 2023, 4 pages.
Brazilian Patent Application No. BR112021002648-7, Office Action mailed Jul. 3, 2023, 4 pages.
Canadian Patent Application No. 3,171,282, Office Action dated Oct. 27, 2023, 11 pages.
Canadian Patent Application No. 3,167,734, Office Action dated Aug. 31, 2023, 6 pages.
Philippine Patent Application No. 1/2021/551201, Substantive Examination Report dated Sep. 6, 2023, 6 pages.
R. Sonntag and C. V. Wylen. Introduction to Thermodynamics: Classical and Statistical, 2nd ed., John Wylie and Sons, Inc., 1982.
PCT International Patent Application No. PCT/US22/41142, International Search Report and Written Opinion of the International Searching Authority dated Jan. 20, 2023, 12 pages.
PCT International Patent Application No. PCT/US23/33101, International Search Report and Written Opinion of the International Searching Authority dated Feb. 8, 2024, 16 pages.
United States U.S. Appl. No. 17/763,413, Office Action mailed Feb. 6, 2024.
United States U.S. Appl. No. 18/077,417, Office Action mailed Mar. 29, 2024.
United States U.S. Appl. No. 18/371,700, Office Action mailed Apr. 18, 2024.
Canivet et al. Water adsorption in MOFs: fundamentals and applications. Chem. Soc. Rev., Aug. 2014, 43(16):5594-5617.
Clus et al. Study of dew water collection in humid tropical islands. Hydrol., Oct. 2008, 361(1-2):159-171.
Fathieh et al. Practical water production from desert air. Sci. Adv., Jun. 2018, 4(6):eaat3198.
Klemm et al. Fog as a Fresh-Water Resource: Overview and Perspectives. Ambio, May 2012, 41(3):221-234.
Lee et al. Water harvest via dewing. Langmuir, Jun. 2012, 28(27):10183-10191.
Muselli et al. Dew water collector for potable water in Ajaccio (Corsica Island, France). Atmos. Res., Sep. 2002, 64,297-312.
Park et al. Optimal Design of Permeable Fiber Network Structures for Fog Harvesting. Langmuir, Oct. 2013, 29(43):13269-13277.
Schemenauer et al. A Proposed Standard Fog Collector for Use in High-Elevation Regions. Appl. Meteorol., Nov. 1994, 33(11):1313-1322.
Wahlgren. Atmospheric Water Vapour Processor Designs for Potable Water Production: A Review. Water Res., Jan. 2001, 35(1):1-22.
PCT International Patent Application No. PCT/IN23/50258, International Search Report and Written Opinion of the International Searching Authority dated Jul. 4, 2023, 10 pages.
Japanese Patent Application No. 2021-529709, Office Action dated Nov. 21, 2023, 6 pages.
U.S. Appl. No. 18/384,992, Office Action mailed Jan. 23, 2024.
U.S. Appl. No. 18/077,417, Office Action mailed Jan. 17, 2024.
Gleick. Water in Crisis: A Guide to the World's Fresh Water Resources. Chapter 2, pp. 13-24. Aug. 1993, Oxford University Press, New York, USA.
European Patent Application No. 21754205.9, Extended European Search Report mailed Apr. 19, 2024. 8 pages.
Singapore Patent Application No. 11202252723Y, Office Action mailed Oct. 31, 2024, 8 pages.
European Patent Application No. EP 19891188.5, Office Action dated Jan. 26, 2024, 7 pages.
European Patent Application No. EP 19891188.5, Response to Office Action filed Apr. 9, 2024, 14 pages.
Lu et al. Tuning the structure and function of metal-organic frameworks via linker design. Chemical Society Reviews, Jan. 2014, 43(16):5561-5593.
PCT International Patent Application No. PCT/US19/63442, International Search Report and Written Opinion of the International Searching Authority dated Jan. 22, 2020, 7 pages.
PCT International Patent Application No. PCT/US20/14647, International Search Report and Written Opinion of the International Searching Authority dated May 5, 2020, 11 pages.
PCT International Patent Application No. PCT/US20/53052, International Search Report and Written Opinion of the International Searching Authority dated Jan. 4, 2021, 10 pages.
PCT International Patent Application No. PCT/US21/16261, International Search Report and Written Opinion of the International Searching Authority dated Apr. 16, 2021, 8 pages.
PCT International Patent Application No. PCT/US21/47491, International Search Report and Written Opinion of the International Searching Authority dated Dec. 7, 2021, 9 pages.
PCT International Patent Application No. PCT/US22/12990, International Search Report and Written Opinion of the International Searching Authority dated Apr. 7, 2021, 14 pages.
PCT International Patent Application No. PCT/US22/26153, International Search Report and Written Opinion of the International Searching Authority dated Jul. 28, 2022, 18 pages.
Ding et al. Carbon capture and conversion using metal-organic frameworks and MOF-based materials. Chem. Soc. Rev., May 2019, 48(2):2783-2828.
Fracaroli et al. Metal-Organic Frameworks with Precisely Designed Interior for Carbon Dioxide Capture in the Presence of Water. Am. Chem. Soc., Jun. 2014, 136, pp. 8863-8866.
Hanikel et al. Rapid Cycling and Exceptional Yield in a Metal-Organic Frameworks for Water Harvester. ACS Cent. Sci., Aug. 2019, 5(10):1699-1706.
Kalmutzki et al. Metal-Organic Frameworks for Water Harvesting from Air; Adv. Mater. Sep. 2018, 30(37):1704304.
Kim et al. Water harvesting from air with metal-organic frameworks powered by natural sunlight. Science, Apr. 2017, 356:430-434.
Kummer et al. A functional full-scale heat exchanger coated with aluminum fumarate metal-organic framework for adsorption heat transformation. Ind. Eng. Chem. Res., Jul. 2017, 56(29):8393-8398.
Li et al. Incorporation of Alkylamine into Metal-Organic Frameworks through a Brønsted Acid-Base Reaction for $CO_2$ Capture. ChemSusChem., Oct. 2016, 9(19):2832-2840.
Tu et al. Progress and Expectation of Atmospheric Water Harvesting. Joule, Aug. 2018, 2(8):1452-1478.
Zhou et al. Atmospheric Water Harvesting: A Review of Material and Structural Designs. ACS Materials Lett., May 2020, 2(7):671-684.

\* cited by examiner

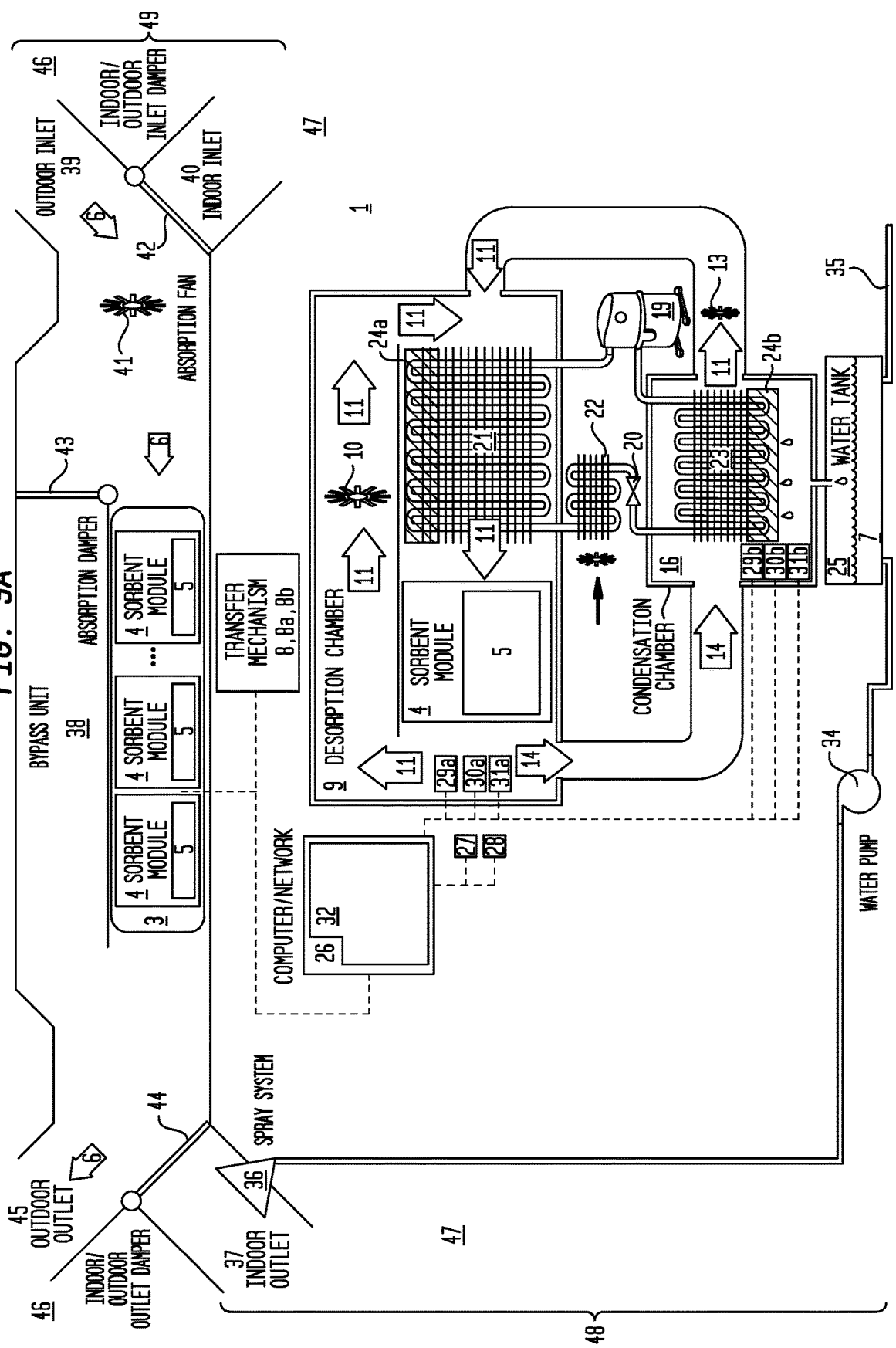

HEAT PUMP-BASED WATER HARVESTING SYSTEMS

This United States Non-Provisional Patent Applications claims the benefit of U.S. Provisional Patent Application No. 63/236,173, filed Aug. 23, 2021, hereby incorporated by reference herein.

I. FIELD

The present disclosure generally relates to water harvesting, and more specifically to systems, apparatus and methods for harvesting water from surrounding air that provide reduced energy costs and improved efficiency in the water harvesting cycle. Also disclosed are water harvesting systems, apparatus and methods of harvesting water configured to dehumidify or humidify air.

II. BACKGROUND

Conventionally, the process of harvesting water from air with sorbents comprises a water harvesting cycle including three energy-intensive stages: adsorption of water vapor from air to a sorbent, desorption of water vapor from the sorbent, and condensation of desorbed water vapor into liquid water. For example, during the adsorption stage, humid environmental air may be blown across a desorbed (activated) sorbent bed. Molecules of water can diffuse through the porous interior of the sorbent bed and become adsorbed by the sorbent. The adsorption stage can be completed when the sorbent bed becomes fully saturated with water. Following the adsorption stage, a desorption stage can be initiated by directly or indirectly heating up the sorbent bed to release water vapor. The desorption stage is completed when the sorbent bed becomes desaturated of water. During the condensation stage, water vapor generated during the desorption stage can be directed to a condensation chamber, where the water vapor cools and condenses into liquid water. Through repetitive cycles of adsorption, desorption and condensation, sorbent-based water harvesting can provide a method to produce water from air.

Generally, there are two heating methods to release water vapor from the saturated sorbent bed: first, direct heating that involves heat transfer from a heat source directly to the surface of the sorbent bed support structure, the sorbent bed, or the sorbent; and second, an indirect heating that involves heating the air surrounding the sorbent bed support structure, the sorbent bed, or the sorbent. Both direct heating and indirect heating can be achieved with resistive heating. Desorption typically requires significant energy, including a latent heat portion related to the desorption energy to change water associated with the sorbent to water vapor, and a sensible energy portion related to heating one or more of the sorbent bed support structure, the sorbent bed, or the sorbent. Potentially, the energy spent on desorption can be recovered during the condensation stage and then reintroduced into the system for desorption. Generally, resistive heating does not provide for recovery of energy spent on desorption.

Additionally, the process of air conditioning typically requires air to be either dehumidified (e.g. to lower water vapor concentration in the air) or air to be humidified or re-humidified (e.g. to raise water vapor concentration in the air). This process can be applied to either recirculated air from indoor spaces (also referred to as "indoors") or air coming from the outdoor environment (also referred to as "outdoors"). Thus, generally, four separate modes (i)-(iv) of air humidity control are considered: (i) dehumidification of air coming from the outdoor environment; (ii) humidification of air coming from the outdoor environment; (iii) dehumidification of recirculated air from indoor spaces; and (iv) humidification of recirculated air from indoor spaces. Examples of dehumidification of air coming from the outdoor environment, mode (i) are common, such as moisture removal from hot, humid air during summertime before it enters office buildings. Humidification of air coming from the outdoor environment, mode (ii), may be needed when the water vapor concentration in air from the outdoor environment falls below the comfort level indoors which often occurs during cold, dry winters. Dehumidification of recirculated air from indoor spaces, mode (iii), can be implemented in indoor spaces, such as: home basements to prevent mold growth and also in vertical farming. Finally, humidification of recirculated air from indoor spaces, mode (iv), may be implemented by heating, ventilation or air conditioning systems to maintain humidity or temperature goals. While there may be conventional systems that address each of modes (i)-(iv) individually, these conventional systems do not address all four modes (i)-(iv) of air humidity control by one system, apparatus or method.

Direct cooling and condensation of water from air using a refrigeration process is often used for dehumidification. Such systems can be implemented both indoors (e.g. small, portable dehumidifiers) and outdoors (e.g. typically, a central air conditioner unit). Also, water removed with a small dehumidifier can be potentially used for humidification of recirculated air from indoor spaces. However, there can be a substantial difficulty in humidifying air in indoor spaces with such systems when taking fresh air into the indoor spaces from the outdoors environment, especially, if the air coming from the outdoors environment contains a lower amount of moisture than the target humidity for the indoor space.

Another potential dehumidification-humidification system can be a desiccant-based unit (e.g. desiccant wheel). Desiccant wheels are usually designed using solid sorbents (e.g. silica gel, porous carbon, zeolite), although liquid desiccants are known (e.g. lithium chloride solution, glycerol). The sorbent can be exposed to air to adsorb water and then heated up using the hot side of a refrigeration system to desorb water out of the desiccant. Generally, the resulting desorbed water vapor does not get condensed into liquid water. These systems can be used to dehumidify and humidify air taken from the outdoor environment. However, they do not typically condition air indoors, as they do not change the amount of moisture present in air recirculated in indoors spaces.

A number of other humidity control systems also exist, such as: thermoelectric direct dewing for condensation, resistive heating for desorption, waste heat for desorption. However, once again, these existing systems do not efficiently address all four modes (i)-(iv) of air humidity control by one system, apparatus or method.

Thus, there would be a substantial advantage in a water harvesting system configured to both reduce energy costs and improves water harvesting cycle efficiency. There would be a further substantial advantage in a single humidification-humidification system, apparatus, or method that can be efficiently address all four modes (i)-(iv) of air humidity control.

III. BRIEF SUMMARY

Provided herein are heat pump-based water harvesting systems (also referred to as the "system") that can reduce overall energy costs in the water harvesting cycle and/or improves efficiency in water production during the water harvesting cycle.

A broad object of particular embodiments of the invention can be to provide an atmospheric water harvesting system, comprising one or more of: a heat-pump; an adsorption unit; a desorption chamber; a transfer mechanism; and a condensation chamber. In particular embodiments, the heat-pump can comprise one or more of: a compressor, an expansion valve, and a heat exchanger, wherein the heat exchanger has a hot side heat exchanger (typically a "condenser") and a cold side heat exchanger (typically an "evaporator"). In particular embodiments, the adsorption unit comprises one or more sorbent module(s), wherein a sorbent module contains one or more sorbents, and the adsorption unit can, but need not necessarily, be physically separated from the heat-pump system. In particular embodiments, the desorption chamber can be connected to or positioned in close proximity to the hot side heat exchanger of the heat pump and can be configured to operate at an average desorption temperature. In particular embodiments, the transfer mechanism can be configured to (i) transfer a sorbent module at least partially saturated with water from the adsorption unit into the desorption chamber, and (ii) transfer the sorbent module at least partially desorbed in the desorption chamber back to the adsorption unit. In particular embodiments, the condensation chamber can encompass or be positioned in close proximity to the cold side heat exchanger of the heat pump and can be configured to operate at an average condensation temperature. In particular variations of the foregoing, the water harvesting system can be configured to operate at an average desorption temperature and the average condensation temperature for the system to (i) achieve the lowest energy per liter of water produced with the one or more sorbents, or (ii) maintain a desorption temperature high enough to sustain a target rate of desorption, and combinations thereof.

Another broad object of particular embodiments of the invention can be to configure particular embodiments of the system to dehumidify-humidify air. Accordingly, embodiment of the system can further comprise one or more of: a collection tank connected to the condensation chamber, configured to collect water condensed from the condensation chamber; a water pump connected to the collection tank, configured to receive water from the collection tank; a drain connected to the collection tank; a sprayer connected to the water pump and positioned in proximity to an indoor outlet; a bypass unit positioned in proximity to the adsorption unit, configured to transfer air from one or both of an outdoor inlet and indoor inlet; an adsorption fan positioned in proximity to the adsorption unit and the bypass unit to transfer air from one or both of the outdoor inlet and indoor inlet into the adsorption unit and the bypass unit; an indoor/outdoor inlet damper configured to control airflow into the adsorption unit and the bypass unit from one or both of the outdoor inlet and the indoor inlet; an adsorption damper configured to direct air into one or both of the adsorption unit and the bypass unit; and an indoor/outdoor outlet damper configured to control airflow out of the adsorption unit and the bypass unit into one or both of an outdoor outlet and an indoor outlet. In particular embodiments, the system can be configured to operate in and switch among a first mode (i) to dehumidify air coming from outdoors to indoors, a second mode (ii) to humidify air coming from outdoors to indoors, a third mode (iii) to dehumidify recirculated indoor air, and a fourth mode (iv) to humidify recirculated indoor air.

Another broad object of particular embodiments of the invention can be a method of harvesting water from surrounding air, including using any of the atmospheric water harvesting systems described herein, or combinations thereof. In particular embodiments, the method can comprise one or more of: a) drawing surrounding air into one or more sorbent module(s) positioned in an adsorption unit, wherein the one or more sorbent modules adsorb water from the surrounding air; b) once the a sorbent module becomes saturated or saturated to a target level of water and/or a rate of adsorption, transferring the sorbent module from the adsorption unit to a desorption chamber using a transfer mechanism; c) blowing air or an air/water mixture across a hot side heat exchanger of a heat pump through the sorbent module positioned in the desorption chamber to facilitate water desorption; d) once the desorption chamber achieves a target water vapor concentration, transferring hot water vapor from the desorption chamber to a cold side heat exchanger of the heat pump; e) optionally repeating c) and d) until the sorbent module in the desorption chamber becomes depleted of adsorbed water or reaches a target depletion of adsorbed water; and f) transferring the sorbent module in the desorption chamber after desorption of water to the adsorption unit, which can be achieved using the transfer mechanism. In particular embodiments of the foregoing, the method can be performed at an average desorption temperature or an average condensation temperature for the water harvesting system, or combinations thereof, to (i) achieve the lowest energy per liter of water produced with one or more sorbents, or (ii) maintain a desorption temperature high enough to sustain a target rate of desorption, and combinations thereof.

Another broad object of particular embodiments of the invention can be a method of controlling the concentration of water vapor in the air (also referred to as "humidity") including using any of the atmospheric water harvesting systems described herein, or combinations thereof. In particular embodiments, the method can comprise one or more of: a) drawing surrounding air into the system; b) depending on the mode (i)-(iv), adjusting the position of dampers to direct airflow from one or both of an outdoor inlet or indoor inlet through one or both of an adsorption unit and a bypass unit to dehumidify air and transfer dehumidified air to an indoor outlet or transfer dehumidified air to an outdoor outlet when the system operates in a dehumidification mode; c) pumping collected water using a water pump from a water collection tank into a sprayer, which can occur when operating the system in a humidification mode; d) humidifying air using the sprayer, which can occur when the system is operating in the humidification mode; e) removing all or a portion of the collected water from the water collection tank using a drain, which can occur when operating the system in a dehumidification mode; f) positioning one or more sorbent module(s) in an adsorption unit, wherein the one or more sorbent modules can adsorb water from the surrounding air; g) once a sorbent module becomes saturated or reaches a target level of adsorbed water and/or rate of adsorption, transferring the saturated sorbent module from the adsorption unit to a desorption chamber, which can be coordinated using the transfer mechanism; h) blowing air or an air/water mixture across the hot side heat exchanger of a heat pump through the sorbent module positioned in the desorption chamber to facilitate water desorption; i) once the desorption chamber achieves a target water vapor concentration, transferring hot water vapor from the desorption chamber to a cold side heat exchanger of the heat pump; j) optionally repeating steps h) and i) until the sorbent module in the desorption chamber becomes depleted or reaches a target depletion level of adsorbed water; and k) transferring the sorbent module in the desorption chamber after desorption of water to the adsorption unit, which can be coordinated using the transfer mechanism.

Another broad object of particular embodiments of the invention can be to provide a sorbent-based system designed to employ a hot side heat exchanger of a refrigeration system to desorb water from a desiccant or to employ the cold side heat exchanger of a refrigeration system to condense water, or combinations thereof, that can then be used for both humidification and dehumidification to address all four modes (i)-(iv) of humidity control by one system, apparatus or method of humidity control described herein. In particular embodiments, the invention provides a water harvesting system that can use metal-organic framework sorbents, and high-temperature heat pumps, which allows for the energy-efficient water removal (dehumidification) and collection/spraying (humidification) and can be used across a wide range humidity level. Specifically, in particular embodiments, the system can be configured to dehumidify outdoor air (e.g. by dehumidifying air and generating water as a by-product). In particular embodiments, the system can be configured to humidify outdoor air (e.g. by capturing water and reintroducing the captured water into air). In particular embodiments, the system can be configured to dehumidify circulating indoor air (e.g. by dehumidifying recirculated indoor air and generating water as a by-product). In particular embodiments, the system can be configured to humidify circulating indoor air (e.g. by capturing water and reintroducing the captured water into recirculated indoor air).

IV. DESCRIPTION OF THE FIGURES

The present application can be best understood by reference to the following description taken in conjunction with the accompanying figures included in the specification.

FIG. 9A depicts a particular embodiment of a water harvesting system configured to dehumidify-humidify air and which can be operated to humidify recirculated indoor air to address mode (iv), including adsorption of water from the air.

V. DETAILED DESCRIPTION

Figure 1:
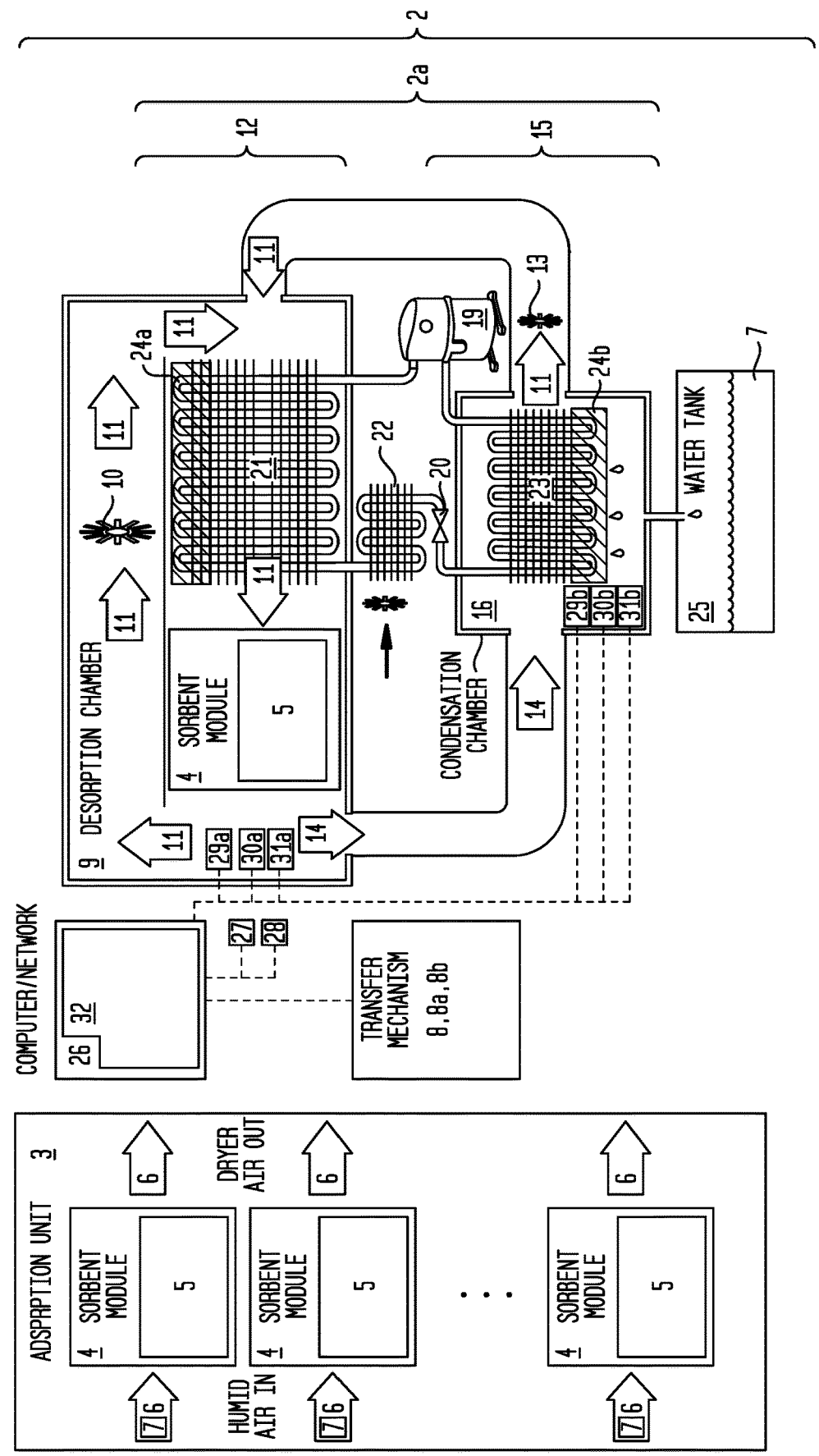
FIG. 1 depicts a schematic of a particular embodiment of a heat pump-based water harvesting system.

The following description sets forth illustrative examples of heat pump-based water harvesting systems (1), methods of making heat pump-based water harvesting systems, and methods of using heat pump-based water harvesting systems. It should be recognized, however, that the examples of heat pump-based water harvesting system (1) provided by the description are not intended to limit the breadth or scope of the description, but instead to provide examples sufficient for a person of ordinary skill in the art to make and use the full breadth and scope of the invention.

Now, with primary reference to FIGS. 1 through 5, illustrative examples of a sorbent-based water harvesting system (1) methods of making and using the sorbent-based water harvesting systems (1) described herein. In some embodiments, the system (1) includes an adsorption unit (3), such as an adsorption rack, that that holds one or more sorbent modules (4) containing at least one sorbent material (5). Air (6) can flow across one or more sorbent modules (4), leading to adsorption of water (7) from the surrounding air (6) by the sorbent material (5) therein. The system (1) can include a transfer mechanism (8), which in particular embodiments can be a carousel (8a) (as shown in the example of FIG. 2A) or can be a robotic arm (8b) (as shown in the example of FIG. 2B). Once one or more of the sorbent modules (4) reach a target level and/or a target rate of adsorption, the transfer mechanism (8) can move the one or more sorbent modules (4) containing adsorbed water from the adsorption unit (3) to a desorption desorption/condensation unit (2) including a desorption chamber (9) into which the sorbent module (4) can be placed for desorption of water (7). In some embodiments, the desorption chamber (9) includes a recirculation fan (10) that blows air or an air/water mixture (11) across a hot side heat exchanger (12) of a heat pump (2a) through the one or more sorbent modules (4) to effectively recover condensation energy and use it for desorption of water (7) from the sorbent module (4). Once a target water concentration is achieved in the desorption chamber (9), in particular embodiments, the system (1) can turn on a desorption-condenser recirculation fan (13) to transfer hot water vapor (14) from the desorption chamber (9) to a cold side heat exchanger (15) of the heat pump (2) encompassed in, or positioned in closer proximity to, a condensation chamber (16). In some variations, the average desorption temperature and/or average condensation temperature for the system (1) can be configured to achieve the lowest energy per liter of water (7) produced with the sorbent material (5) and can keep the desorption temperature high enough to sustain a target desorption rate. Upon water depletion or reaching a water depletion level of the sorbent module (4), the transfer mechanism (8) can remove the one or more sorbent modules (4) from the desorption chamber (9) and places the one or more sorbent modules (4) back into the adsorption unit (3). Particular embodiments of the sorbent-based water harvesting system (1) can achieve increased water adsorption, as well as continuous desorption and condensation at elevated temperatures.

Figure 2A:
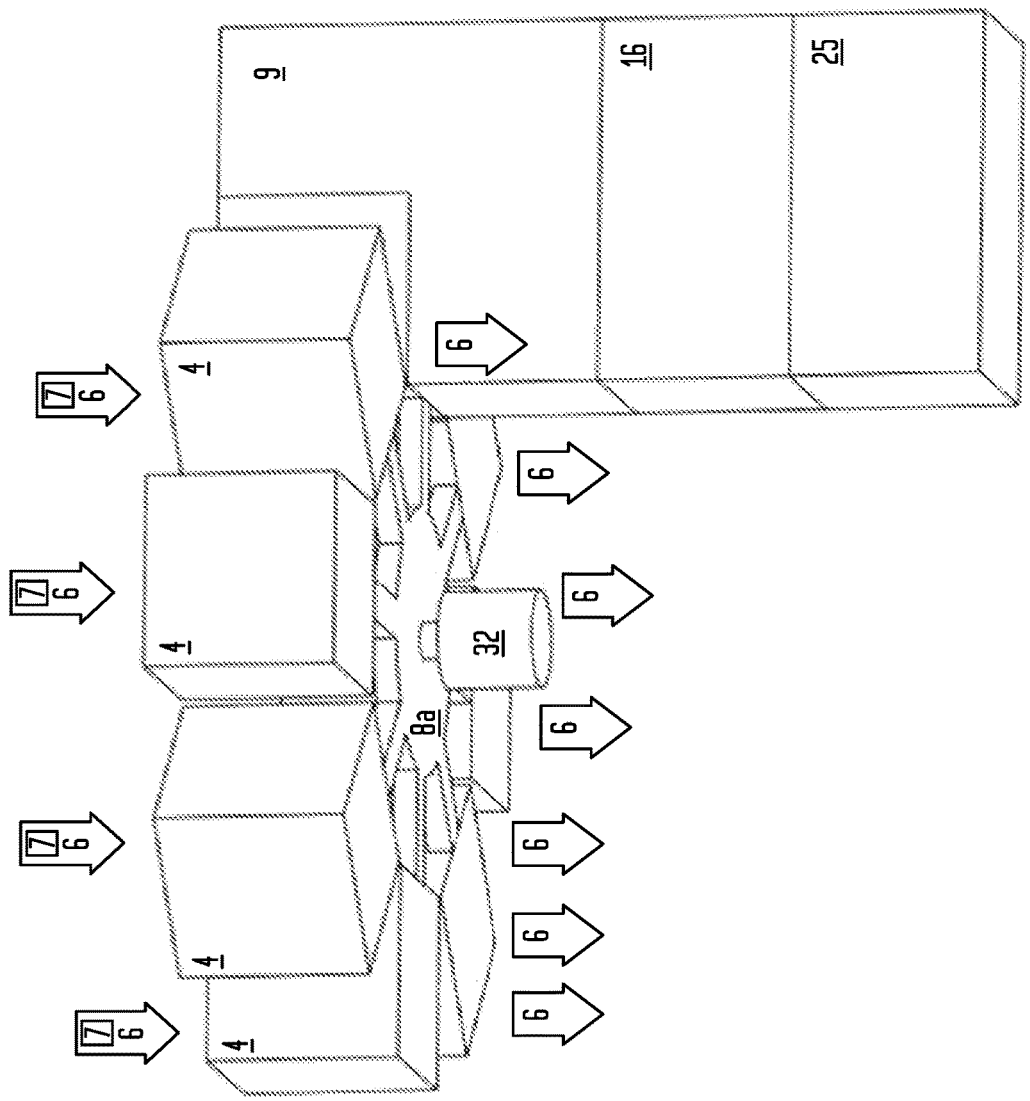
FIG. 2A depicts a particular embodiment of a heat pump-based water harvesting system that includes a rotating carousel configured to continuously move fully or partially saturated MOF modules into the desorption chamber of the desorption/condensation unit for desorption.
Figure 2B:
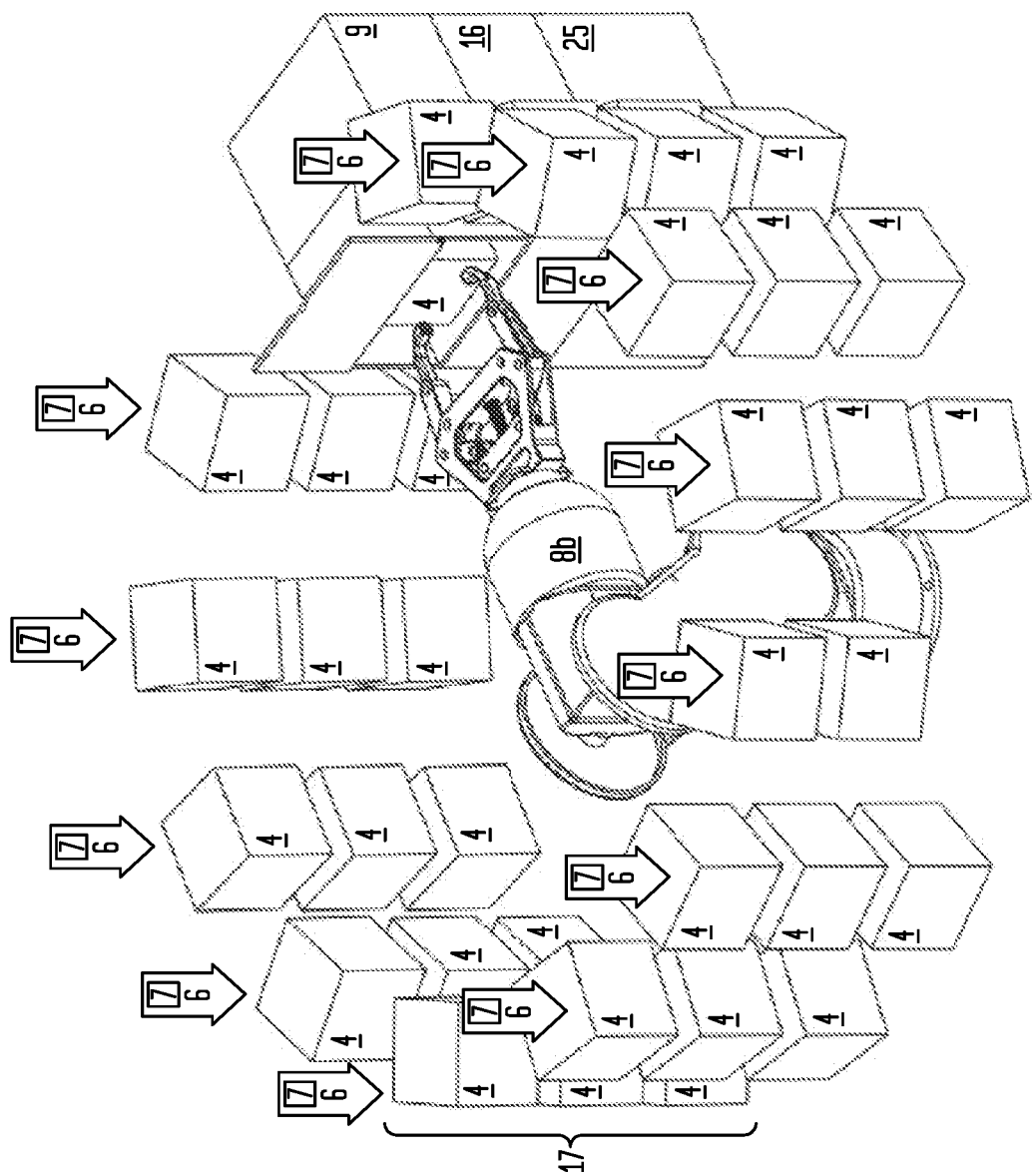
FIG. 2B depicts another particular embodiment of a heat pump-based water harvesting system that includes a multi-axis robotic arm configured to switch the MOF modules between the adsorption unit and the desorption chamber.

In particular embodiments, as depicted in FIG. 2A, the example system (1) utilizes a carousel (8a) which rotates one or more sorbent module(s) (4). While one or more sorbent modules (4) are being desorbed in the desorption chamber (9), the remaining sorbent modules (4) can be exposed to humid environmental air (6). In particular embodiments, as depicted in FIG. 2B, a robotic arm (8b) can be utilized to transfer the one or more sorbent modules (4) from an adsorption rack (17) to the desorption chamber (9). Again, with reference to FIG. 1, in particular embodiments, the heat-pump (2a) includes a heat exchanger (18), which has a hot side heat exchanger (12) and a cold side heat exchanger (15). In some variations, the heat-pump (2a) can include a compressor (19), an expansion valve (20), a main "condenser" or hot-side heat exchanger (21), a secondary hot-side heat exchanger (22), an "evaporator" or cold-side heat exchanger (23), and other control components designed to operate at elevated temperatures. For example, in particular embodiments, the "condenser" or hot side of the heat exchanger (21) can be set to operate at temperatures in the range of about 90° C. to about 160° C., and the "evaporator" or cold-side heat exchanger (23) can be set to operate at temperatures in the range of about 40° C. to about 95° C.

Again, with reference to FIG. 1, the "condenser" or hot side heat exchanger (21) in the desorption chamber (9) and the "evaporator" or cold-side heat exchanger (23) in the condensation chamber (16) can be respectively coupled to a heat sink(s) (24a, 24b) to provide substantially constant or constant temperature operation when the sorbent modules (4) move in and out of the desorption chamber (9). The heat sink(s) (24a, 24b) can be a metal block or any other material of high thermal mass in both the desorption chamber (9) and condensation chambers (16). It can also be liquid water (7) in the condensation chamber (16).

The performance of a heat pump system can generally be modelled by the following equations:

$$W = \frac{Q_c}{COP} \quad (1)$$

and $$COP = f \frac{T_c}{T_h - T_c} \quad (2)$$

where W is the work input by the compressor (19), Qc is the energy extracted from the cold-side heat exchanger (23), COP is the coefficient of performance, $T_h$ is the temperature of the hot-side heat exchanger (21), $T_c$ is the temperature of the cold-side heat exchanger (23), and f is an empirical coefficient based on practical design of the system (1). In some variations, f is between about 0.4 to about 0.6. Low $T_h-T_c$ and high $T_c$ values typically lead to a more energy-efficient design of the heat pump (2).

In certain embodiments, the system (1) and methods of using the system (1) can be devised to ensure effective thermal coupling between the hot-side heat exchanger (21) and the desorbing sorbent module(s) (4). Hot water vapor (14) generated during desorption can be directed to the condensation chamber (16) which contains the "evaporator" or cold-side heat exchanger (23) where the water vapor (14) can be condensed into water (6). Liquid water (7) can then be collected in a water tank (25). The residual saturated and relatively cold water vapor (14) can be recirculated back into the desorption chamber (9) to avoid excessive water loss in the environment.

In some variations, the system (1) can further include a computer (26) coupled to one or more ambient air temperature sensors (27) and/or ambient air humidity sensors (28) located outside of the desorption chamber (9) and condensation chamber (16) adapted to or configured to measure ambient air temperature and/or ambient air humidity of the environment surrounding the system (1). The computer (26) can be respectively coupled to one or more temperature sensors (29a, 29b) and/or one or more humidity sensors (30a, 30b) and/or one or more airflow sensors (31a, 31b) that can be respectively located inside the desorption chamber (9) and/or the condensation chamber (16) to measure respective desorption chamber temperature and/or humidity, and/or condensation chamber temperature and/or humidity. The temperature and/or humidity measurements based on readings from the desorption chamber and condensation chamber sensors (29a, 29b, 30a, 30b) and the environment temperature and/or humidity measurements based on readings from the ambient temperature and humidity sensors (27, 28) can be used under the control of the computer (26) implementing a water harvesting algorithm (32) to adjust operating parameters of the system (1), for example, to modify performance of the system (1) in terms of energy use, water production, and operation of the heat-pump (2a).

Any suitable sorbent material (5) can be used in embodiments of the system (1) and methods described herein. In particular embodiments, the sorbent material (5) can include one or more metal-organic frameworks ("MOFs"). Generally, MOFs offer unique characteristics that are desirable for harvesting water (7) from air (6). See e.g. H. Furukawa et al., *Water Adsorption in Porous Metal-Organic Frameworks and Related Materials*, J. Am. Chem. Soc. 2014, 136, 11, 4369-4381. MOFs may be characterized by high water uptake and step-like characteristics for water uptake versus relative humidity ("RH"). In some variations, suitable sorbent materials (5), including MOFs, have such an isotherm step, which can be tailored to various climates. See e.g. WO2020112899. The isotherm step is typically a weak function of temperature due to hydrogen binding between the interior of the MOF pore and the water molecules. The step isotherm enables water capture and release by MOF in a very narrow range of relative humidity (about 3 to about 5% of RH).

In some variations, the MOF is: MOF-303: Al(OH) (HPDC), where HPDC is 1H-pyrazole-3,5-dicarboxylate; CAU-10: Al(OH)(IPA), where IPA is isophthalate; MOF-801: $Zr_6O_4(OH)_4$(fumarate)$_6$; MOF-841: $Zr_6O_4(OH)_4$ $(MTB)_6(HCOO)_4(H_2O)_2$; Aluminum Fumarate: Al(OH)(fumarate); MIL-160: Al(OH)(FDA), where FDA is 2,5-furandicarboxylate; MIL-53: Al(OH)(TPA), where TPA is terephthalate; or Aluminum Phosphate: AlPO4-LTA. In some variations, the MOFs have pore sizes in the range of about 0.5 nm to about 1 nm, or between about 0.7 nm to about 0.9 nm. In certain variations, the MOFs have a hydrophilic pore structure. In certain variations, the MOFs have a hydrophilic pore structure comprising acid and/or amine functional groups. In certain variations, the MOFs have one-dimensional channels that allow for reversible water adsorption. Any combinations of the MOFs described herein, or other MOFs, or sorbents capable of water adsorption/desorption may also be used. In some embodiments, the MOF can be mixed with a binder to improve its properties for adhesion to a substrate or support.

In other variations, other sorbents (5) having high water uptake abilities as well as the isotherm step described above may be used in the systems and methods described herein. Other suitable sorbents (5) may include, for example, certain molecular sieves (as one example, SAPO-34 a micropore zeolite, CAS No. 1318-02-1) and certain zeolites having the properties described above.

Rate of water desorption in the sorbent materials (5) (including the above-described MOFs) and saturated vapor pressure in air values increase exponentially with temperature. The specific desorption energy, on the other hand, decreases with temperature. These three factors all favor a design of the desorption process at elevated temperatures. However, higher desorption temperature incurs a higher sensible heat penalty from the sorbent material (5), water (7) inside the sorbent material (5), support structure, recirculating air (7), and water vapor. The condensation temperature needs to be below the dew point of the desorbed hot water vapor (14). More water (7) can be condensed in a single pass through the cold-side heat exchanger (23) with lower condensation temperature, but the heat-pump COP value becomes lower with increase in $T_h-T_c$ and decrease in $T_c$. Consequently, desorption and condensation temperatures for the water harvesting system (1) can be adjusted to achieve the lowest energy per liter of water produced with a given sorbent material (5).

Again, with primary reference to FIG. 2A, another example of the system (1) is depicted in which a rotating carousel (8a) continuously moves fully saturated MOF containing sorbent module(s) (4) into a desorption chamber (9) for desorption. Once a MOF sorbent module (4) moves into the desorption chamber (9), it is heated-up to release water (7) as hot water vapor (14). Simultaneously, the other MOF sorbent modules (4) can be exposed to air (6) blown across them to initiate adsorption. In particular embodiments, upon completed desorption, a motor (32) with positioning control can rotate the carousel (8a) to move the desorbed sorbent module or MOF sorbent module (4) out of the desorption chamber (9) and allowing a saturated MOF sorbent module (4) to enter the desorption chamber (9).

With reference to FIG. 2B, another example of the system (1) is depicted in which a multi-axis robotic arm (8b) (or other automated mechanism) handles switching of the MOF sorbent modules (4) between an adsorption rack (17) and the desorption chamber (9). As soon as the MOF sorbent module (4) is sufficiently desorbed in the desorption chamber (9), it can be removed by the robot arm (8b) and placed back into the adsorption rack (17). A new fully adsorbed MOF sorbent module (4) can be picked up and placed by the robotic arm (8b) into the desorption chamber (9). A computer and water harvesting algorithm (32) can be used to track desorption and adsorption status of each module.

Figure 3:
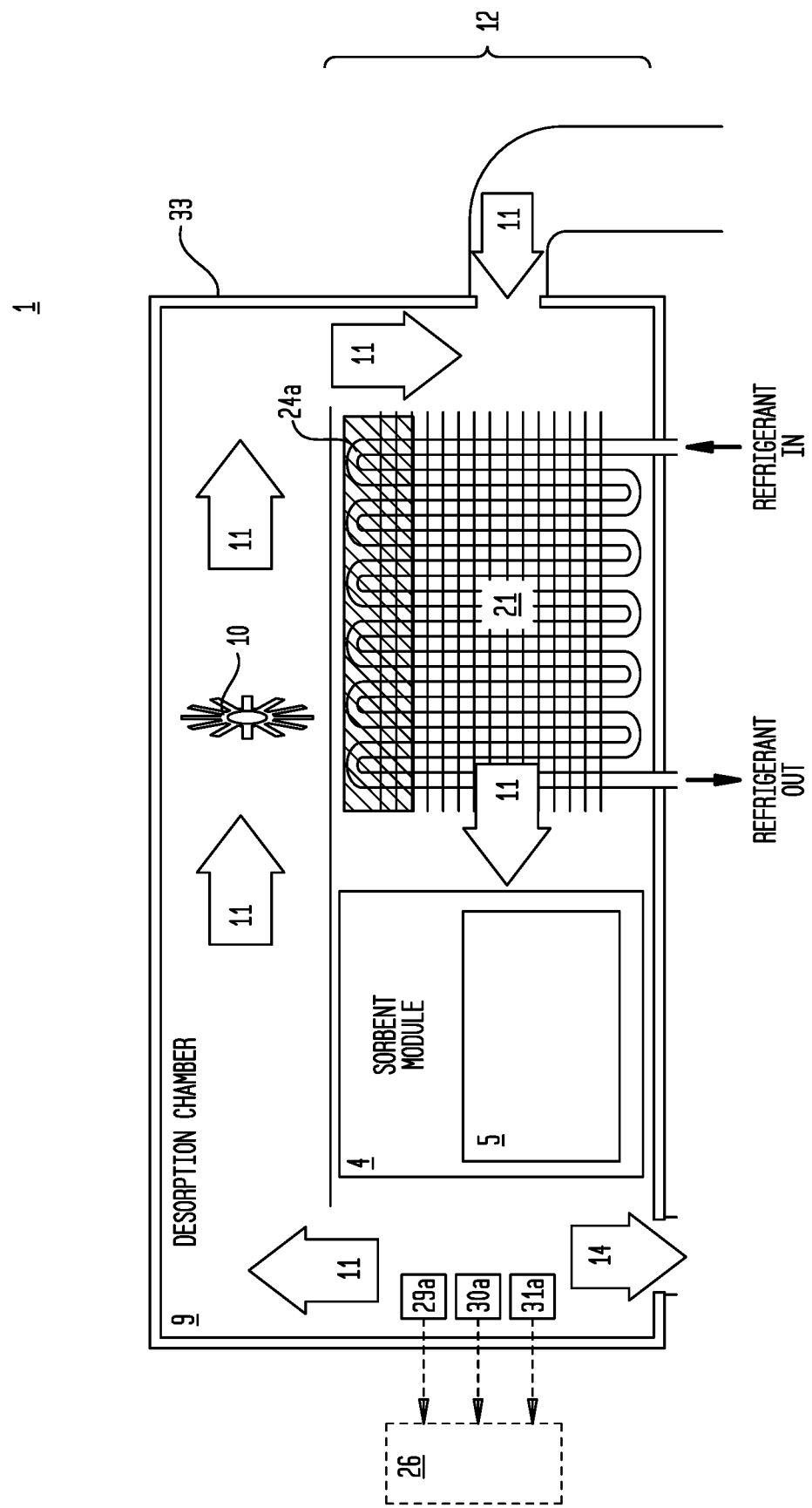
FIG. 3 depicts a schematic of a particular embodiment of a thermal coupling between a "condenser" hot side heat exchanger and a MOF module in a desorption chamber.

Now, with primary reference to FIG. 3, a schematic diagram illustrates a thermal coupling between the "condenser" hot-side heat exchanger (21) and the MOF sorbent module (4) in a desorption chamber (9). The desorption chamber (9) is thermally isolated from the environment with insulated walls (33). A recirculation fan (10) blows air (6) across the hot-side heat exchanger (21) to raise the temperature when a sufficiently adsorbed MOF sorbent module(s) (4) is placed into the desorption chamber (9). This air (6) or air/water mixture (11) heated by being blown across the hot-side heat exchanger (21) can then be blown across the MOF sorbent module(s)(4) to raise the temperature of the MOF sorbent module (4) to release the adsorbed water (7). A portion of the hot water vapor (14) released from the MOF sorbent module (4) can then be circulated by the recirculation fan (10) back to the hot-side main heat exchanger (21) to continue raising the at least one MOF sorbent material (5) temperature to the desired operating desorption temperature. A portion of the hot water vapor (14) from the MOF sorbent module (4) can be directed to the condensation chamber (16) for condensation. Depending on water vapor conditions (RH and temperature values) at the exit of the MOF sorbent module (4), the re-circulating and desorption rates can be adjusted by varied operation of the variable-speed recirculation fan (10) to adjust the flow of the air/water mixture (11) using a pre-determined algorithm (31). The goals are to achieve a constant energy load of the heat exchangers and to maintain a high moisture content of the hot water vapor (14) for more efficient condensation yield. Thermal coupling between the hot-side heat exchanger (21) and the MOF sorbent module (4) can also be improved by physical contact of the heat exchanger and the MOF sorbent module (4).

It should be understood that while FIGS. 2A, 2B and 3 illustrate particular embodiments of MOF sorbent modules (4) in the system (1), other suitable sorbent modules (4) may be used in other variations of the systems (1) described herein.

Figure 4:
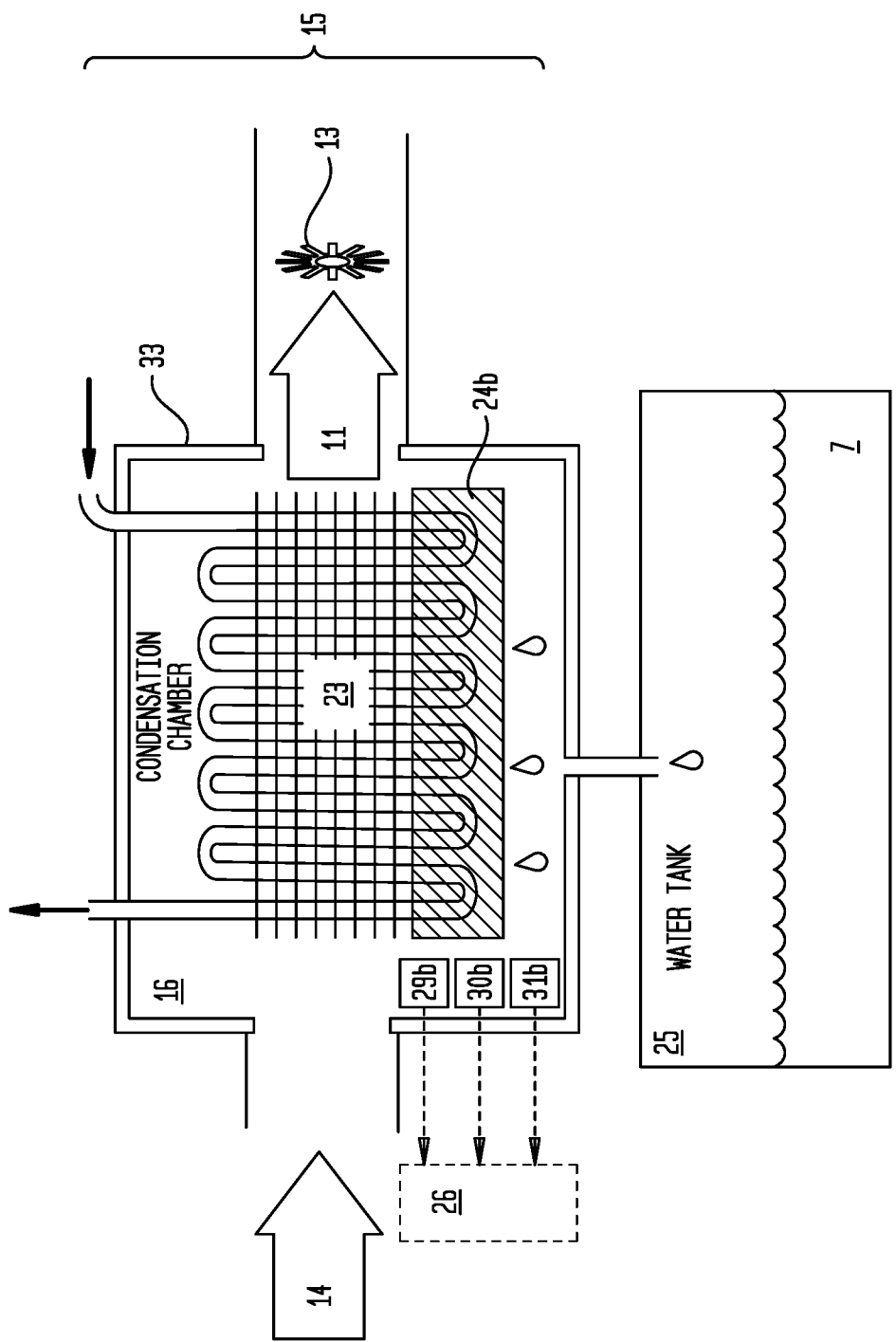
FIG. 4 depicts a schematic of a particular embodiment a heat pump-based water harvesting system configured for water vapor condensation and liquid water collection.

Now, with primary reference to FIG. 4, which depicts an illustrative schematic for the hot water vapor (14) condensation and liquid water (7) collection. In such embodiment, the condensation chamber (16) can be enclosed in a thermally insulated wall (33) (or other manner of condensation chamber insulation). Hot water vapor (14) can flow from the desorption chamber (9) and passed through the "evaporator" cold-side heat exchanger (23) allowing the hot water vapor (14) to cool and water (7) to condense upon reaching the dew point. The exhaust carries cooler air/water mixture (11) back into the desorption chamber (9). A heat sink (24b) can be thermally coupled to the cold-side heat exchanger (23) to maintain the desired operating temperature for water condensation. Liquid water (7) can drip down from the fins of the cold-side heat exchanger (23) and can be collected in the water collection tank (25) below the condensation chamber (16). A desorption-condenser recirculation fan (13) can be used to control and recirculate hot-water vapor (14) and the exhaust cooler an air/water mixture (11) between the desorption chamber (9) and condensation chamber(s) (16).

Figure 5:
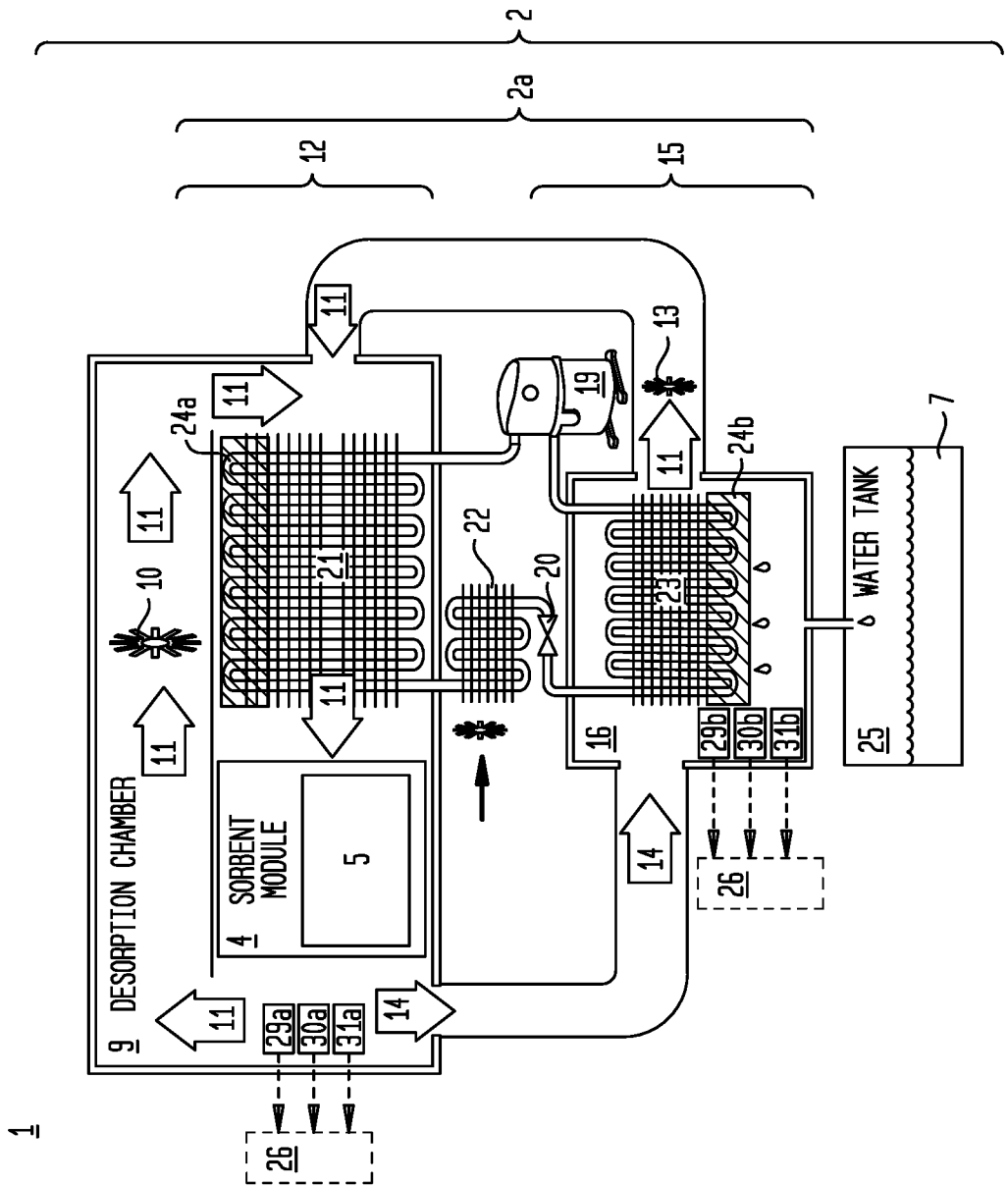
FIG. 5 depicts parts of a particular embodiment of a heat pump-based water harvesting system in which temperature, humidity, or velocity of circulating air, and combinations thereof, are measured.

Now, with primary reference to FIG. 5 which depicts components of an illustrative example of a particular embodiment of the system (1) where the temperature, humidity, and velocity of the circulating air values can be measured, as above described. Temperature of the hot-side heat exchanger (21) and cold-side heat exchanger (23) can also be measured. Based on these measured values, the computer (26) by execution of the water harvesting algorithm (32) can assess the energy loads for each heat exchanger (21, 22, 23). In some variations, the computer (26) in the system (1) may be programmed to adjust the air flow rates by changing the fan speed of the recirculating fans (10, 13) to maintain nearly constant energy loads for each heat exchanger (21, 22, or 23) included in the system (1) and to achieve the desired temperature for the desorption and condensation processes. Heat pump energy balance can be obtained between the power input of the compressor, $\dot{W}$, the energy load of the cold-side heat exchanger, $\dot{Q}_c$, and the energy loads of the hot-side heat exchangers, which are denoted by $\dot{Q}_{hm}$ and $\dot{Q}_{hs}$ separately for the main and the secondary heat exchangers can be expressed as:

$$\dot{W}=(\dot{Q}_{hm}+\dot{Q}_{hs})-\dot{Q}_c \tag{3}$$

See R. Sonntag and C. V. Wylen, *Introduction to Thermodynamics Classical and Statistical*, 2$^{nd}$ ed., John Wylie and Sons, 1982.

The compressor work input is constant based on the compressor design and the operating conditions. In some variations, to recycle the majority of the recovered condensation heat for desorption, the system is configured to set the following:

$$\dot{Q}_{hm} = \dot{Q}_c \quad (4)$$

and $$\dot{Q}_{hs} = \dot{W} \quad (5)$$

Thus, the energy load of the hot-side heat exchanger (21) equals to that of the cold-side heat exchanger (23). Some power input can be dissipated by the secondary hot-side heat exchanger (22) to the environment.

The hot-side heat exchanger (21) configuration may be modeled by taking into account energy "gain" due to incoming and outgoing airflow, which should be equal to the energy dissipated by the hot-side heat exchanger.

$$\dot{Q}_{hm} = \dot{m}_b C_{pb} T_b - \dot{m}_a C_{pa} T_a \quad (6)$$

where $\dot{m}_b$ is the air/water vapor mixture mass flow rate, $C_{pb}$ the specific heat capacity, and $T_b$ the temperature at location b; $\dot{m}_a$ is the air/water vapor mixture mass flow rate, $C_{pa}$ the specific heat capacity, and $T_a$ the temperature at location a. $T_b$ should be approximately equal to $T_h$, which is the operating temperature of the hot-side heat exchanger (21) with a targeted heat exchanger design. The mass flow rate can be estimated using the air density, air velocity and cross-sectional area of the heat exchanger. Initially, when the fully adsorbed sorbent module (4) (e.g. MOF sorbent module) is moved into the desorption chamber (9) for desorption, $T_a$ is low but quickly heats up during the desorption process. The system (1) increases the desorption recirculation fan speed (10) according to the equation (6) to maintain constant $\dot{Q}_{hm}$.

The energy balance for the secondary hot-side heat exchanger (22) can be expressed as follows:

$$\dot{Q}_{hs} = \dot{W} = h_s A_s (T_h - T_f) \quad (7)$$

where $h_s$ is the heat transfer coefficient of the secondary hot-side heat exchanger (22) which is a function of heat transfer geometry and air flow, A, area of the fins of the heat exchanger, and $T_f$ the environment temperature. The system (1) adjusts the rate of the airflow across the secondary hot-side heat exchanger (22) to maintain a constant energy dissipation rate as the environment temperature changes.

Both the sensible heat and the latent heat portions of the energy load at the cold-side heat exchanger need to be considered for the condensation process.

$$\dot{Q}_c = \dot{m}_d C_{pd} T_d - \dot{m}_e C_{pe} T_e + H_{fg}\left(\frac{\dot{m}_d}{\rho_d}\phi_d - \frac{\dot{m}_e}{\rho_e}\phi_e\right) \quad (8)$$

where $\dot{m}_d$ is the air/water vapor mixture mass flow rate, $C_{pd}$ the specific heat capacity, $T_d$ the temperature, $\rho_d$ the air density, and $\Phi_d$ the absolute humidity at location d; $\dot{m}_e$ is the air/water vapor mixture mass flow rate, $C_{pe}$ the specific heat capacity, $T_e$ the temperature, $\rho_e$ the air density, and $\Phi_e$ the absolute humidity at location e and $H_{fg}$ is the latent heat of water at the condensation temperature. $T_e$ should be approximately equal to the cold-side heat exchanger temperature with the targeted heat exchanger design.

In some variations, the system (1) adjusts the desorption-condenser recirculation fan (13) speed to maintain a constant energy load for the cold-side heat exchanger (23) as temperature and humidity values of the incoming and outcoming air/water vapor mixture changes.

Again, with general reference to FIGS. 1 through 9A and 9B, particular embodiments of the sorbent-based water harvesting system (1) can be configured for dehumidification-humidification of air (6) that employs a heat pump (2a) to effectively recover condensation energy and use it for desorption of hot water vapor (14) from the sorbent material (5). Particular embodiments afford a method of using any of the sorbent-based water harvesting systems (1) described herein to control humidity level from surrounding air (6).

Now, with primary reference to FIGS. 1, 2A and 2B, particular embodiments of the system (1) can include an adsorption unit (3) that can hold one or a plurality of sorbent modules (4) containing at least one sorbent material (5). As a first illustrative example, the adsorption unit (3) can comprise a rotating carousel (8a) as shown in FIG. 2A, and as a second illustrative example, the adsorption unit (3) can comprise an adsorption rack (17) in which a plurality of sorbent modules (4) can be stacked as shown in the example of FIG. 2B. In particular embodiments of the system (1), a transfer mechanism (8) can be used to move the one or each of the plurality of absorbent modules (4) from the adsorption unit (3) to the desorption chamber (9). As shown in the example of FIG. 2A, the carousel (8a) can include a plurality of absorption modules (4) disposed radially outward of and spaced circumferentially around a central rotation axis. The carousel (8a) can rotate to move each of the plurality of adsorption modules (4) into the desorption chamber (9). As shown in the example of FIG. 2B, a robotic arm (8b) can operate to move each of the plurality of absorption modules (4) from the adsorption rack (17) into the desorption chamber (9). Air (6) can be pushed across one or more sorbent modules (4), leading to adsorption of water (7) from the surrounding air (6) by the sorbent material (5) contained in the one or the plurality of sorbent modules (4). Once a sorbent module (4) reaches a target level and/or rate of adsorption, the transfer mechanism (8) can move the sorbent module (4) with adsorbed water (7) from the adsorption unit (3) to a desorption chamber (9) of the system (1). In some embodiments, the desorption chamber (9) can include a recirculation fan (10) that blows an air/water mixture (11) across the hot side (12) of the heat pump (2) through the sorbent module (4) to facilitate desorption of water (7). Once a target water concentration is achieved in the desorption chamber (9), the system (1) can operate a desorption-condenser recirculation fan (13) present in the desorption chamber to transfer hot moisture from the desorption chamber (9) to the cold side (15) of the heat pump (2a) encompassed in, or positioned in closer proximity to, a condensation chamber (16).

Now, with primary reference to FIGS. 1, 6-9A and 9B, particular embodiments the system (1) configured for dehumidification-humidification of air (6) can further comprise one or more of: a water collection tank (25) connected to the condensation chamber (16), configured to collect water (7) condensed in the condensation chamber (16); a water pump (34) connected to the water collection tank (25), configured to receive water (7) from the water collection tank (25); a drain (35) connected to the water collection tank (25); a sprayer (36) connected to the water pump (34) and positioned in proximity to an indoor outlet (37); a bypass unit (38) positioned in proximity to the adsorption unit (3), configured to transfer air (6) from outdoor inlet (39) or an indoor inlet (40) or combination thereof; an adsorption fan (41) positioned in proximity to the adsorption unit (3) and the bypass unit (38) to transfer air (6) from the outdoor inlet (39) or the indoor inlet (40), or combination thereof, into the adsorption unit (3) and the bypass unit (38); an indoor/outdoor inlet damper (42) configured to control the transfer of air (6) into the adsorption unit (3) and the bypass unit (38) from the outdoor inlet (39) or the indoor inlet (40), or combination thereof; an adsorption damper (43) configured to direct a portion of the flow of air (6) into the adsorption unit (3) and a portion of the flow of air (6) into the bypass unit (38); and an indoor/outdoor outlet damper (44) configured to control the flow of air (6) out of the adsorption unit (3) and the bypass unit (38) into an outdoor outlet (45) or the indoor outlet (37) or combination thereof.

Particular embodiments of the system (1) can be configured to operate in and switch among a plurality of modes (i)-(iv) including a first mode (i) to dehumidify air (6) coming from outdoors (46) to indoors (47), a second mode (ii) to humidify air (6) coming from outdoors (46) to indoors (47), a third mode (iii) to dehumidify recirculated air (6) indoors (47), and a fourth mode (iv) to humidify recirculated air (6) indoors (47).

In particular embodiments of the system (1), the average desorption temperature or the average condensation temperature, whether independent of each other or in relation to each other, can be configured to achieve the lowest energy per liter of water produced with the sorbent material (5), and in certain embodiments, maintaining the desorption temperature high enough to sustain a target desorption rate. Once the sorbent module (4) is depleted of water (7) or depleted to a target depletion level of water (7), the transfer mechanism (8) can remove the sorbent module (4) from the desorption chamber (9) and return the sorbent module (4) back into the adsorption unit (3).

Now, with primary reference to FIGS. 6 through 9A and 9B, an illustrative example of the system (1) configured for humidification-dehumidification can include an adsorption unit (3) (as examples an adsorption rack (17) or carousel (8a) including one or more sorbent modules (4)) (as an example, one or more MOF modules), an transfer mechanism (8) (such as, a carousel (8a) or a robotic arm (8b)), a discrete desorption/condensation unit (2) that includes a heat-pump (2a). In some embodiments, the heat-pump (2) includes a heat exchanger (18), which has a hot side (12) (a "condenser") and a cold side (15) (an "evaporator"). In some variations, the heat-pump (2a) can include a compressor (19), an expansion valve (20), a main "condenser" or the hot-side heat exchanger (21), a secondary hot-side heat exchanger (22), an "evaporator" or the cold-side heat exchanger (23), and other control components which can be designed to operate at elevated temperatures. In particular embodiments, the system (1) can include a spraying unit (48) including a water collection tank (25), a drain (35), a water pump (34), a water sprayer (36) connected to the water pump (34). In addition, an airflow system (49) can comprise one or more of: an indoor/outdoor inlet damper (42), an indoor/outdoor outlet damper (44) and an adsorption damper (43). The system (1) can include an adsorption fan (41) and a bypass unit (38). The adsorption unit (3) and the set of dampers (42)(43)(44) can be positioned in a way to either adsorb water from outdoors (46) to work in modes (i) or (ii) or indoors (47) to work in modes (iii) and (iv). The set of dampers (42)(43)(44) control the direction of the flow of air (6). The transfer mechanism (8) can transfer sorbent modules (4) in and out of the separate desorption/condensation unit (2). Water vapor (14) undergoes desorption and condensation processes in the desorption/condensation unit (2) and then collected in the water collection tank (25). When the system (1) enters humidification mode, the collected water (7) can be delivered by the water spraying unit (48). When the system (1) enters dehumidification mode, the collected water (7) can be transported into the drain (35).

Mode (i): Outdoor Air Dehumidifier

Figure 6:
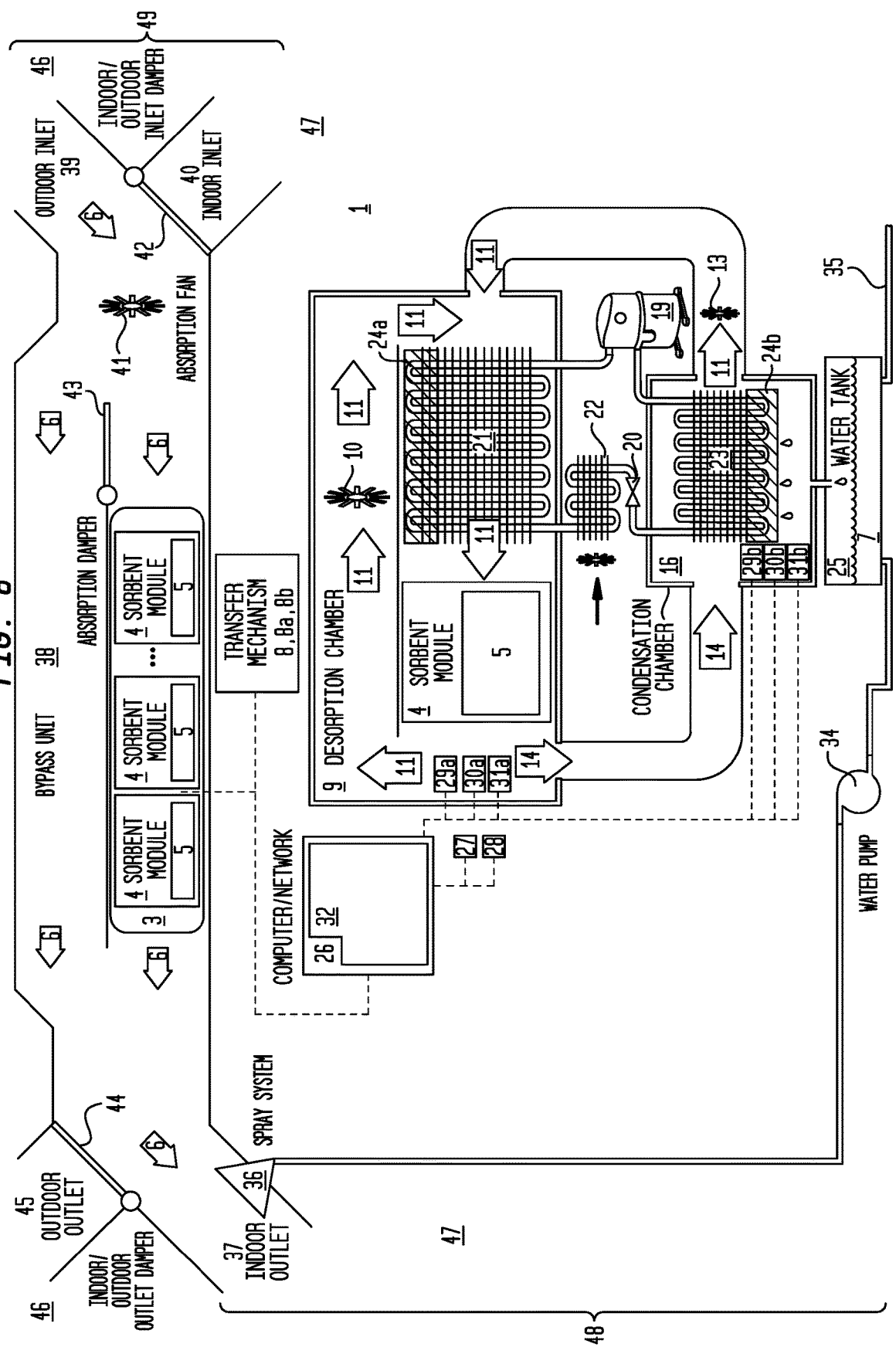
FIG. 6 depicts a particular embodiment of a water harvesting system configured to dehumidify-humidify air and which can operate to dehumidify outdoor air to address mode (i).

Now, with primary reference to FIG. 6, depicted is an illustrative example of the system (1) configured for dehumidification of air coming from outdoors (46) to indoors (47). The indoor/outdoor inlet damper (42) opens the outdoor inlet (39) and closes the indoor inlet (40). Air (6) from outdoors (46) can pass through the outdoor inlet (39) and then in part passes through the adsorption unit (3) and in part pass through bypass unit (38). The amount of air (6) from outdoors (46) that passes through the adsorption unit (3) to be dehumidified and the amount of air (6) from outdoors (46) that pass through the bypass unit (38) can be controlled by operation of the adsorption damper (43), which can be positioned in a range between an open or closed condition of the adsorption unit (3) and an open or closed condition of the bypass unit (38). The indoor/outdoor outlet damper (44) closes the outdoor outlet (45) and opens the indoor outlet (37). The dehumidified air (6) can be directed indoors (47) through the indoor outlet (37). The water spraying unit (48) can remain in the off condition in mode (i). The sorption modules (4) saturated with water (7) can be placed into the desorption/condensation unit (2), the desorbed water (7) can be condensed in the desorption chamber (9) and water (7) can be collected in the water collection tank (25). Collected water can be kept in the water collection tank (25) or removed through the drain (35).

Mode (ii): Outdoor Air Humidifier

Figure 7:
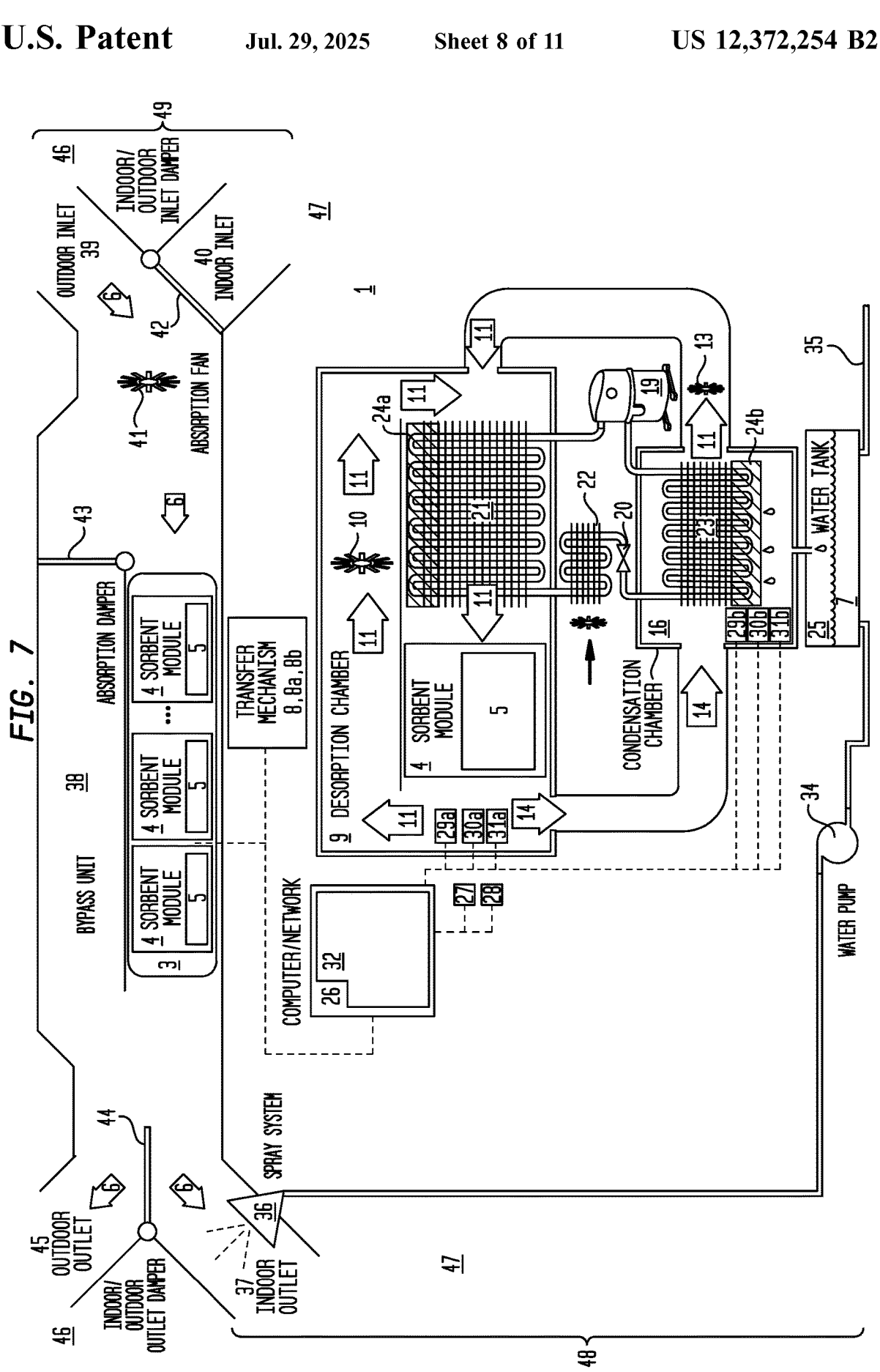
FIG. 7 depicts a particular embodiment of a water harvesting system configured to dehumidify-humidify air and which can operate to humidify outdoor air to address mode (ii).

Now, with primary reference to FIG. 7, depicted is an illustrative example of the system (1) configured to humidify air (6) coming from outdoors (46) to indoors (47). The indoor/outdoor inlet damper (42) opens the outdoor inlet (39) and closes the indoor inlet (40). The adsorption damper (43) closes the bypass unit (38). Air (6) from outdoors (46) passes through the outdoor inlet (39) and only passes through the adsorption unit (3). The indoor/outdoor outlet damper (44) can be positioned to partially open the outdoor outlet (45) and partially open the indoor outlet (37). The amount of dehumidified air (6) directed outdoors (46) through the outdoor outlet (44) and the amount of dehumidified air (6) directed indoors (47) through indoor outlet (37) can be controlled by the position of indoor/outdoor outlet damper (44). The water spraying unit (48) can be placed in the on condition. The sorption modules (4) saturated with water (7) can be placed into the desorption/condensation unit (2), the desorbed water (7) can be condensed in the desorption chamber (9) and water (7) can be collected in the water collection tank (25). Collected water (7) can be pumped to the water sprayer (36) using the water pump (34).

Mode (iii): Indoor Air Dehumidifier

Figure 8:
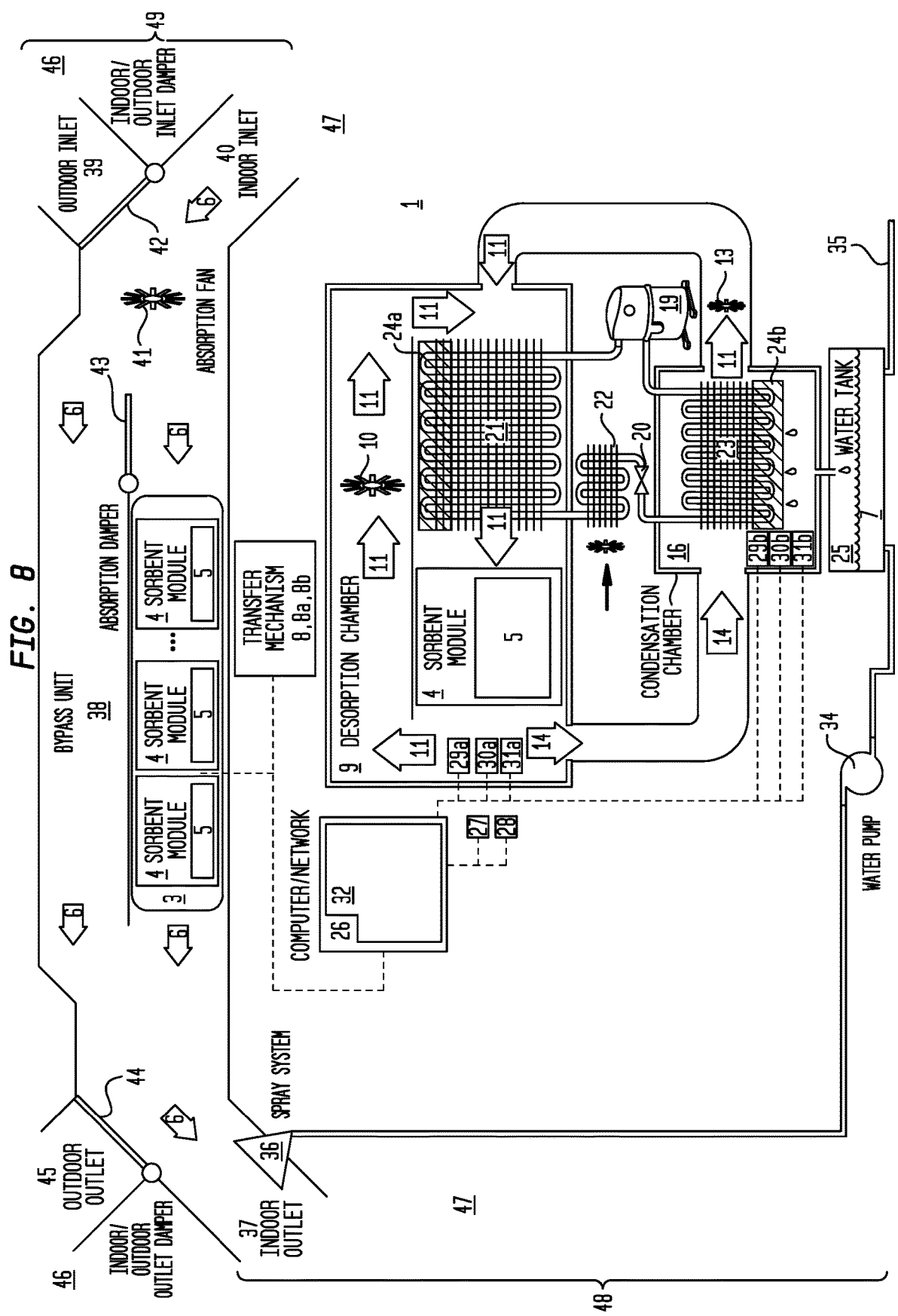
FIG. 8 depicts particular embodiment of a water harvesting system configured to dehumidify-humidify air and which can be operated to dehumidify recirculated indoor air to address mode (iii).

Now, with primary reference to FIG. 8, depicted is an illustrative example of the system (1) configured to dehumidify recirculated indoor (47) air (6). The indoor/outdoor inlet damper (42) opens the indoor inlet (40) and closes the outdoor inlet (46). Air (6) from indoors (47) can pass through indoor inlet (40) and then in part pass through the adsorption unit (3) and in part through the bypass unit (38). The amount of air (6) from indoors (47) that passes through the adsorption unit (3) and the amount of air (6) that passes through the bypass unit (38) can be controlled by the position of the adsorption damper (43), which can be positioned from a closed condition of the bypass unit (38) to a closed condition of the adsorption unit (3) or positioned to a partially open condition of both the bypass unit (38) and the adsorption unit (3). The indoor/outdoor outlet damper (44) closes the outdoor outlet (45) and opens the indoor outlet (37). The dehumidified air (6) can then be directed indoors (47) through the indoor outlet (37). The spraying system can remain in the off condition. The sorption modules (4) saturated with water (7) are placed into the desorption/condensation unit (2), the desorbed water (7) can be condensed in the desorption chamber (9) and collected in the water collection tank (25). Collected water (7) can be kept in the water collection tank (25) or removed from the water collection tank (25) through the drain (35).

Mode (iv): Indoor Air Humidifier

Figure 9B:
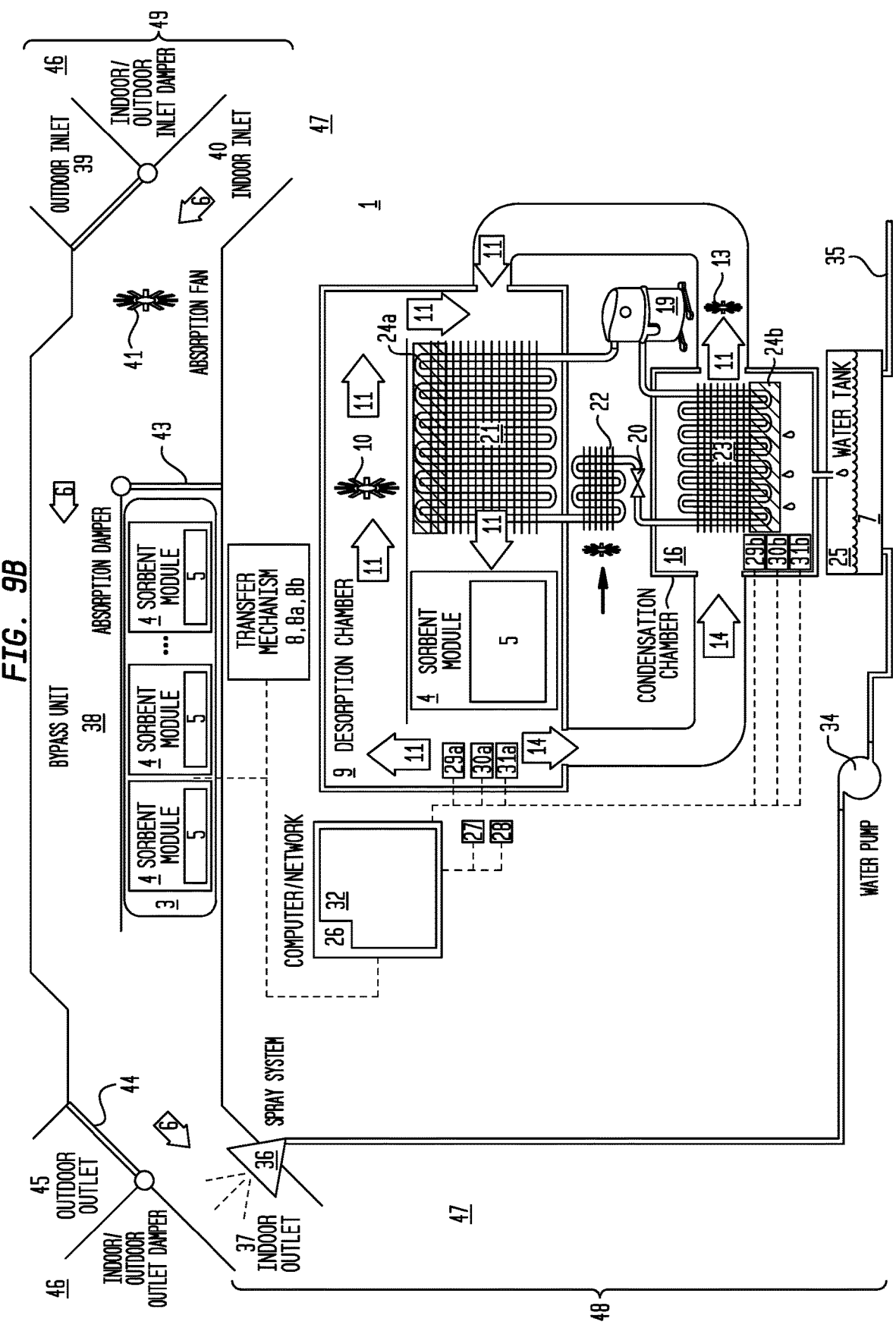
FIG. 9B depicts a particular embodiment of a water harvesting system configured to dehumidify-humidify air and which can be operated to humidify recirculated indoor air to address mode (iv), including introducing water collected by adsorption from the air into recirculated indoor air.

Now, with primary reference to FIGS. 9A and 9B, depicted is an illustrative example of the system (1) configured for humidification of recirculated indoor (47) air (6). Initially, in a first configuration of the system (1) (as depicted in the example of FIG. 9A), the indoor/outdoor inlet damper (42) opens the outdoor inlet (39) and closes the indoor inlet (40). The adsorption damper (43) closes the bypass unit (38). Outdoor (46) air (6) can pass though outdoor inlet (39) and then passes only through the adsorption unit (3). The indoor/outdoor outlet damper (44) closes the indoor outlet (37) and opens the outdoor outlet (44). The dehumidified air (6) passes outdoors (46) through the outdoor outlet (45). The water spraying unit (48) can remain in the off condition. The sorption modules (4) saturated with water (7) can be transferred to the desorption/condensation unit (2), the desorbed water (7) can be condensed in the desorption chamber (9) and collected in the water collection tank (25). Collected water (7) can be kept in the water collection tank (25).

Subsequently, in a second configuration of the system (1) (as depicted in the example of FIG. 9B), the indoor/outdoor inlet damper (42) closes the outdoor inlet (39) and opens the indoor inlet (40). The adsorption damper (43) closes the adsorption unit (3). Air (6) from indoors (47) can pass through the indoor inlet (40) and then only through the bypass unit (38). The indoor/outdoor outlet damper (44) closes the outdoor outlet (44) and opens the indoor outlet (37). The air (6) from the bypass unit (38) can be directed indoors (47) through indoor outlet (37). The collected water (7) in the water collection tank (25) can by operation of the water pump (34) be conducted to the sprayer (36) sprayed from the sprayer (36) into the air passing through the indoor outlet (37) to humidify the air (6) passing indoors (47).

EXAMPLES

The presently disclosed subject matter will be better understood by reference to the following Examples, which are provided as exemplary of the invention, and not by way of limitation.

Example 1

Optimizing Desorption and Condensation Temperatures

The example describes optimization of desorption and condensation temperatures used in a water harvesting system. The model used an iterative procedure. First, the model set the initial desorption and condensation temperatures of the system. Based on the isotherm step of the sorbent, the absolute humidity in the desorption chamber was known at the given desorption temperature. The condensation yield can be calculated for the given condensation temperature, if the relative humidity and temperature of the water vapor in the desorption chamber is known. The heat pump efficiency was computed with equation (2) assuming f=0.6 and in turn the work input is calculated using equation (1). In addition to the desorption and condensation energy, the model further considered the sensible heat value required to heat up the sorbent, water inside sorbent, air, and vapor. The model also took into account the temperature of the recycled vapor and the specified total water harvesting yield of the system. Thus, the system energy consumption per liter of harvested water was approximated as a function of the desorption and condensation temperatures with a given MOF type. The optimum conditions were obtained by varying the two variables (desorption and condensation temperatures). See Table 1 below.

TABLE 1

| MOFType | Isotherm step @25° C. (RH %) | Desorption Temperature (OC) | Condensation Temperature (OC) |
| --- | --- | --- | --- |
| Arid | 20 | 136 | 90 |
| Moderate | 40 | 117 | 91 |
| Humid | 60 | 107 | 92 |

Table 1 shows the optimal desorption and condensation temperatures for three types of MOFs. The water harvester which contains an arid-type MOF with an isotherm step of 20% of relative humidity (RH) at 25° C. optimally operates at the desorption temperature of 136° C. and the condensation temperature of 90° C. "Moderate" MOF with an isotherm step of RH 40% requires desorption and condensation temperatures of 117° C. and 91° C., respectively; while a "humid" MOF with an isotherm step of RH 60% requires desorption and condensation temperatures at 107° C. and 92° C., respectively.

Table 1 indicates that utilization of a high-temperature heat pump is required to achieve the lowest energy consumption per liter of harvester water given that the high-temperature heat pump operates at 90-160° C. for the hot-side heat exchanger and 40-95° C. for the cold-side heat exchanger.

As can be easily understood from the foregoing, the basic concepts of the present invention may be embodied in a variety of ways. The invention involves numerous and varied embodiments of a water harvesting system and methods for making and using the varied embodiments of the water harvesting system including the best mode.

As such, the particular embodiments or elements of the invention disclosed by the description or shown in the figures or tables accompanying this application are not intended to be limiting, but rather illustrative of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "harvester" should be understood to encompass disclosure of the act of "harvesting"—whether explicitly discussed or not—and, conversely, were there effectively disclosure of the act of "harvesting", such a disclosure should be understood to encompass disclosure of a "harvester" and even a "means for harvesting." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in Merriam-Webster's Collegiate Dictionary, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the water harvesters herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

What is claimed is:

1. An atmospheric water harvesting system, comprising:
a heat pump having a hot side heat exchanger and a cold side heat exchanger;
an adsorption unit comprising a plurality of sorbent modules, wherein each of said plurality of sorbent modules contains one or more sorbents, said adsorption unit disposed physically separate from said heat pump;
a desorption chamber connected to or positioned in close proximity to said hot side heat exchanger of said heat pump, said desorption chamber is configured to operate at a desorption temperature, wherein one or more of said plurality of sorbent modules disposed in said desorption chamber releases water vapor from said one or more sorbents at said desorption temperature; and
a condensation chamber encompassing or positioned in close proximity to said cold side heat exchanger of said heat pump, wherein said condensation chamber is configured to operate at a condensation temperature, wherein said condensation chamber is fluidically coupled to said desorption chamber to receive said water vapor, said water vapor condenses within said condensation chamber at said condensation temperature, wherein said desorption temperature and said condensation temperature each independently controlled to achieve the lowest energy consumption per liter of water.

2. The system of claim 1, further comprising at least one recirculation fan configured to: (i) transfer heat from said hot side heat exchanger to said sorbent module in said desorption chamber, and (ii) drive desorption of water from said sorbent module to achieve a higher concentration of water in said desorption chamber.

3. The system of claim 1, further comprising a secondary hot side heat exchanger.

4. The system of claim 1, further comprising one or more control components to regulate said heat pump.

5. The system of claim 1, wherein the system further comprises a water collection tank.

6. The system of claim 1, wherein one or more sorbents comprises a metal-organic framework.

7. The system of claim 6, wherein said metal-organic framework has an isotherm step of about 20% relative humidity at about 25° C.

8. The system of claim 7, wherein said desorption temperature occurs in a range of about 130° C. to about 140° C., and wherein said condensation temperature occurs in a range of about 85° C. to about 95° C.

9. The system of claim 6, wherein said metal-organic framework has an isotherm step of about 40% relative humidity at about 25° C.

10. The system of claim 9, wherein said desorption temperature occurs in a range of about 115° C. to about 125° C., and wherein said condensation temperature occurs in a range of about 85° C. to about 95° C.

11. The system of claim 6, wherein said metal-organic framework has an isotherm step of about 60% relative humidity at about 25° C.

12. The system of claim 11, wherein said desorption temperature occurs in a range of about 100° C. to about 110° C., and wherein said condensation temperature occurs in a range of about 85° C. to about 95° C.

13. A system, comprising:
a heat pump having a hot side heat exchanger and a cold side heat exchanger;
an adsorption unit comprising a sorbent module, said sorbent module contains one or more sorbents, said adsorption unit disposed physically separate from said heat pump;
a desorption chamber connected to or positioned in close proximity to said hot side heat exchanger of said heat pump;
a condensation chamber encompassing or positioned in close proximity to said cold side heat exchanger of said heat pump;
a water collection tank connected to said condensation chamber, said water collection tank configured to collect water condensed from said condensation chamber;
a water pump connected to said water collection tank, configured to receive said water from said collection tank;
a sprayer connected to said water pump and positioned in proximity to an indoor outlet;
a bypass unit positioned in proximity to the adsorption unit, configured to transfer air from an outdoor inlet or indoor inlet;
an adsorption fan positioned in proximity to said adsorption unit and said bypass unit to transfer air from said outdoor inlet or indoor inlet into the adsorption unit and the bypass unit;
an indoor/outdoor inlet damper configured to control flow of air into the adsorption unit and the bypass unit from said outdoor inlet or said indoor inlet;
an adsorption damper configured to direct a portion of airflow into the adsorption unit and a portion of airflow into the bypass unit; and
an indoor/outdoor outlet damper configured to control flow of air out of the adsorption unit and the bypass unit into an outdoor outlet or an indoor outlet,
said system adapted to switch operation between a first mode to dehumidify said air from said outdoor inlet to said indoor outlet, a second mode to humidify air from outdoor inlet to indoor outlet, a third mode to dehumidify air recirculated from said indoor inlet to said indoor outlet, and fourth mode to humidify air recirculated from said indoor inlet to said indoor outlet.

14. The system of claim 13, wherein in said first mode:
said indoor/outdoor inlet damper closes said indoor inlet and opens said outdoor inlet, to transfer air from said outdoor inlet to said adsorption unit and to said bypass unit;
said adsorption damper controls said portion of airflow into the adsorption unit and said portion of airflow into said bypass unit;
said indoor/outdoor outlet damper closes said outdoor outlet and opens said indoor outlet to transfer dehumidified air from said adsorption unit through said indoor outlet;
a transfer mechanism transfers said sorbent module at least partially saturated with water from said adsorption unit into said desorption chamber, wherein water desorbs from said one or more sorbents contained in said sorbent module, wherein said water desorbed from said one or more sorbents condenses in said condensation chamber;
said water condensed in said condensation chamber collects in said water collection tank, wherein at least a portion of said water collected in said water collection tank transferred to a drain; and
said water pump remains in an off condition.

15. The system of claim 13, wherein in said second mode:
said indoor/outdoor inlet damper closes an indoor inlet and opens said outdoor inlet to transfer air from said outdoor inlet to said adsorption unit and to said bypass unit;
said adsorption damper closes said bypass unit and opens said adsorption unit;
said indoor/outdoor outlet damper partially opens said outdoor outlet and said indoor outlet to transfer dehumidified air from said adsorption through said indoor outlet and through said outdoor outlet;
a transfer mechanism transfers said sorbent module at least partially saturated with water from said adsorption unit into said desorption chamber, wherein water desorbs from said one or more sorbents contained in said sorbent module, wherein said water desorbed from said one or more sorbents condenses in said condensation chamber; and
said water condensed in said condensation chamber collects in said water collection tank, wherein at least a portion of said water collected in said water collection tank transferred to a drain;
at least a portion of said water in water collection tank transferred by said water pump to said sprayer to humidify air transferred through the indoor outlet, said drain remains in an off condition.

16. The system of claim 13, wherein in said third mode:
said indoor/outdoor inlet damper closes said outdoor inlet and opens said indoor inlet to transfer air from said indoor inlet to said adsorption unit and to said bypass unit;
said adsorption damper controls said portion of airflow into the adsorption unit and said portion of airflow into said bypass unit;
said indoor/outdoor outlet damper closes said outdoor outlet and opens said indoor outlet, to transfer dehumidified air from said adsorption unit through said indoor outlet;
a transfer mechanism transfers said sorbent module at least partially saturated with water from said adsorption unit into said desorption chamber, wherein water desorbs from said one or more sorbents contained in said sorbent module, wherein said water desorbed from said one or more sorbents condenses in said condensation chamber;
said water condensed in said condensation chamber collects in said water collection tank, wherein at least a portion of said water collected in said water collection tank transferred to a drain; and
said water pump remains in an off condition.

17. The system of claim 13, wherein in said fourth mode, said system operates in a first configuration and subsequently said system operates in a second configuration, wherein said system in first configuration:
said indoor/outdoor inlet damper closes said indoor inlet and opens said outdoor inlet, to transfer air to said adsorption unit and said bypass unit;
said adsorption damper closes said bypass unit and opens said adsorption unit;
said indoor/outdoor outlet damper closes said indoor outlet and opens said outdoor outlet to transfer air from said adsorption unit through said outdoor outlet;
a transfer mechanism transfers said sorbent module at least partially saturated with water from said adsorption unit into said desorption chamber, wherein water desorbs from said one or more sorbents contained in said sorbent module, wherein said water desorbed from said one or more sorbents condenses in said condensation chamber;
said water condensed in said condensation chamber collects in said water collection tank, said water pump remains in an off condition, and
wherein said system in said second configuration:
said indoor/outdoor inlet damper closes said outdoor inlet and opens said indoor inlet, to allow air to transfer to said absorbent unit and said bypass unit;
said adsorption damper closes said adsorption unit and opens said bypass unit;
said indoor/outdoor outlet damper closes said outdoor outlet and opens said indoor outlet to transfer air from said bypass unit through said indoor outlet;
at least a portion of said water in water collection tank transferred by said water pump to said sprayer to humidify air transferred through the indoor outlet, said drain remains in an off condition.

18. A system, comprising:
a heat pump having a hot side heat exchanger and a cold side heat exchanger;
an adsorption unit comprising a sorbent module, said sorbent module contains one or more sorbents, said adsorption unit disposed physically separate from said heat pump;
a desorption chamber connected to or positioned in close proximity to said hot side heat exchanger of said heat pump;
a condensation chamber encompassing or positioned in close proximity to said cold side heat exchanger of said heat pump; and
at least one desorption-condenser recirculation fan configured to (i) transfer water desorbed from said sorbent module in said desorption chamber to said condensation chamber, and (ii) recirculate remaining desorbed water from said sorbent module in the condensation chamber back into the desorption chamber.

19. A system, comprising:
a heat pump having a hot side heat exchanger and a cold side heat exchanger;
an adsorption unit comprising a sorbent module, said sorbent module contains one or more sorbents, said adsorption unit disposed physically separate from said heat pump;
a desorption chamber connected to or positioned in close proximity to said hot side heat exchanger of said heat pump;
a condensation chamber encompassing or positioned in close proximity to said cold side heat exchanger of said heat pump; and
a transfer mechanism configured to (i) transfer said sorbent module at least partially saturated with water from said adsorption unit into said desorption chamber, and (ii) transfer said sorbent module at least partially desorbed of said water from said desorption chamber back to said adsorption unit.

\* \* \* \* \*